(12) United States Patent
Codaccioni et al.

(10) Patent No.: US 7,561,883 B2
(45) Date of Patent: Jul. 14, 2009

(54) SYSTEM AND METHOD FOR MANAGEMENT OF THE RESOURCES OF A BROADBAND MOBILE NETWORK HAVING PROLONGED FIXED ACCESSES BY WIRELESS LOCAL AREA NETWORK ACCESS TERMINALS

(75) Inventors: Yann Codaccioni, Paris (FR); Dean Mathoorasing, Issy les Moulineaux (FR)

(73) Assignee: France Telecom, Paris (FR)

( * ) Notice: Subject to any disclaimer, the term of this patent is extended or adjusted under 35 U.S.C. 154(b) by 778 days.

(21) Appl. No.: 11/305,123

(22) Filed: Dec. 19, 2005

(65) Prior Publication Data

US 2006/0146807 A1    Jul. 6, 2006

(30) Foreign Application Priority Data

Dec. 20, 2004    (FR) .................... 04 13604

(51) Int. Cl.
*H04B 7/00* (2006.01)
*H04W 4/00* (2009.01)

(52) U.S. Cl. .................... 455/453; 455/513; 370/332
(58) Field of Classification Search .................... None
See application file for complete search history.

(56) References Cited

U.S. PATENT DOCUMENTS

| 6,327,472 | B1 | 12/2001 | Westroos et al. |
| 6,567,665 | B1 | 5/2003 | Kissee |
| 7,315,744 | B2 * | 1/2008 | Achour .................... 455/453 |
| 2003/0133420 | A1 | 7/2003 | Haddad |

* cited by examiner

*Primary Examiner*—Nick Corsaro
*Assistant Examiner*—Joel Ajayi
(74) *Attorney, Agent, or Firm*—Young & Thompson

(57) ABSTRACT

A method of the resources of a broadband mobile network including radio access terminals ($BA_i$) and a broadband access server (BAS). Upon transmission of a request for access ra_A (.) for connection by a prospective user mobile terminal ($TU_c$) to a specific access terminal ($BA_s$), discrimination (A) is carried out of the level of radioelectric power received by ($TU_c$), the network identifiers ($IDTU_c$) of this latter and the application ($RA_c$) requested, on the basis of ra_A (.) the network identifiers are compared with reference identifiers ($IDRU_R$) in order to control access, and from a list of eligible radio access terminals including the terminal ($BA_s$) and at least one adjacent radio access terminal, $LBA_e$=[BAs:LBAv] a prospective radio access terminal $BA_c$=$BAx$; x $\in$[s,v] is discriminated as a function of the location of $TU_c$ relative to ($BA_s$), the throughput load of each terminal and the requested application.

14 Claims, 11 Drawing Sheets

SYSTEM AND METHOD FOR MANAGEMENT OF THE RESOURCES OF A BROADBAND MOBILE NETWORK HAVING PROLONGED FIXED ACCESSES BY WIRELESS LOCAL AREA NETWORK ACCESS TERMINALS

BACKGROUND OF THE INVENTION

At the present time the wireless local area network (WLAN) technology is increasingly used coupled either to the asymmetric digital subscriber line (ADSL) or to the satellite access network or even to the local radio loop, possibly to the fibre to the home or curb (FTTH/C).

The WLAN then represents a radio extension of an already existing network which is not necessarily a radio network but may be for example a TCP/IP network.

Thus by means of the aforementioned radio extensions a plurality of distinct users are enabled to access the same access point of the already existing network.

The fact that several users exist at one and the same access point then makes it necessary to resort to the management of the resources of the network. However, the procedures for sharing existing network resources then differ according to the types of access available.

In the case of ADSL networks, within the information system there are specific items of equipment, such as the access gateway to services situated in the command level or equipment, making it possible to centralise a certain number of data relating to the sessions of the network users.

For example, the Internet profile server is an additional module to the access gateway to services. This module makes it possible to associate the terminal of a client with the network offer under access conditions to which this latter has subscribed. The Internet profile server is constructed around a database containing a list of ADSL client terminals, network access conditions to which these latter have subscribed and authorised Internet access providers. The database of the Internet profile server is supplied and updated on the basis of data from the information system according to a file transfer protocol once per day. As for counting the communication units consumed, the access gateway to services stores in a table of its database the counting dockets which it received from the broadband access server (BAS).

Within the context of ADSL technology, nowadays several mobile or fixed user terminals can be connected simultaneously over one and the same access point to one and only one ADSL line. These users use one and the same subscription defining the access conditions, that of the user terminal which subscribed thereto.

In particular, regardless of these subscriptions and the access conditions relating thereto, the sharing of the transmission resources of an ADSL line is effected in an equitable manner among all the user terminals.

From the point of view of control of the network, authentication, authorisation and counting of the accesses and transactions, this control is carried out as if only one single user existed.

By way of non-limiting example, with reference to FIG. 1 one session each is mounted on the access terminal $BA_1$, the user terminal $TU_1$ and the user terminal $TU_2$. These latter have been authenticated with the same identifier. The aforementioned user terminals share the pass band supplied by the subscription $A_1$ and the corresponding network access conditions.

Likewise on the access terminal $BA_2$ only the user terminal $TU_3$ is authenticated. The user terminals $TU_4$ and $TU_5$ use the same session as the user terminal $TU_3$. The pass band supplied by the subscription $A_3$ is shared among the different connected user terminals.

In the case of hotspot-type networks, networks of the WIFI type, several user terminals can access the network using WIFI technology from one and the same access point but with different subscriptions and therefore different network access conditions.

At the level of the resources, the access point, ADSL access, rented link, etc., is shared in an equitable manner among all the connected user terminals.

However, CISCO have developed a system called CMX, for Cisco Mobile exchange, which has certain functionalities of distribution and sharing of the network resources. It is for example possible to establish rules enabling data streams to be routed as a function of the nature of the required service or application, real time application such as voice communication VOIP on the Internet or non-real-time application such as transmission of data. The aforementioned system necessitates significant provisions in the access network.

The fixed ADSL networks and the hotspot-type networks which are known in the prior art have the following drawbacks or limitations.

For the fixed ADSL-type networks, the operator does not have data relating to the capacity and to the resources of the network. Hitherto, there was no corresponding need since the network is dimensioned in such a way as to meet the needs of each user terminal. By the addition of radio access terminals such as WIFI terminals as extensions to the fixed ADSL network, complete data are not always available to enable the base network to manage the transmission resources of a broadband mobile network with small cells. The small size of the cells results directly from the technical characteristics of the WIFI terminals and of the regulations relating thereto.

In fact the parameters necessary in order to constitute a broadband mobile network including fixed accesses prolonged by wireless local area network access terminals, WIFI access terminals, are in particular specific data relating to the occupancy rate of the radio access terminals, to the radio access terminals accessible by a user mobile terminal, to the reception power of the user terminals, to the relative location of the users, for example.

Consequently, it is in no way conceivable to implement a dynamic management of the network resources in order to be able to optimise these latter. One single offer or condition of access to the network is implemented on one and the same radio access terminal. By way of consequence, the network resources are not optimised, the data streams being treated from the point of view of the network resources in an identical manner, independently of the real time or non-real-time application. A balance between the allocation of network resource and the intrinsic characteristics of this or that user terminal cannot be envisaged.

For the hotspot-type networks, the network resources are simply shared among the different users in an equitable manner. Although the idea of equitable sharing could cover a relative distribution of the network resources, it is not however possible to allocate more or fewer network resources to this or that user terminal.

For the CMX networks of CISCO, strictly speaking there are in existence no processes for distribution of the network resources among the user terminals connected to one and the same radio access terminal. Moreover, this solution necessitates a significant additional investment as well as modifications at the level of the access network.

SUMMARY OF THE INVENTION

The object of the present invention is to remedy the drawbacks and limitations of the fixed ADSL networks and/or hotspots of the prior art in order to improve the functional qualities and possibilities in a sensible manner.

In particular, a more specific object of the present invention is the implementation of a protocol and of a system of management of the resources of a broadband mobile network, including prolonged fixed accesses by wireless local area access networks, and therefore based on the use of radio terminals, of the WIFI, WIMAX or other types, and operating as extensions of another access network in order to permit a plurality of subscribers to access simultaneously different applications or services, real time and/or non-real-time applications, by implementing a control adapted to the network resources. It will be recalled that the concept of broadband mobile network covers any mobile network which allows access to real time applications, such as the transmission of voice communications, consuming a wide pass band, or to non-real-time applications, such as the transmission of data in packets with more restricted consumption.

This object is achieved by introducing a conditional discrimination of at least one prospective radio access terminal using the criteria of location of the user mobile terminal, traffic load of the radio access terminals and the type of application required, and by establishing rules of relative dynamic priority of the data streams as a function of the conditions of access to the network which are available and the different applications requested and/or executed.

Another object of the present invention is likewise, by virtue of the implementation of the management of the aforementioned network resources and establishment of the rules of relative dynamic priority of the data stream, to obtain an optimisation of the use of the network for access to the requested application, whilst maintaining a quality of service of transmission and access to the requested applications which is sufficient for all the user terminals.

Consequently, another object of the present invention is to implement a centralised system for management of the resources of a broadband mobile network including at least prolonged fixed accesses by an array of wireless local area network radio access terminals, a broadband access server and decision-making modules which receive as input parameters network data recovered and routed by this network. The decision-making results of these decision-making modules enable in a dynamic manner:

- a distribution of the load of the network, by radio access terminal, such as for example an XDSL radio modem;
- an optimisation of the network resources;
- an optimisation of the quality of service (QoS) provided to the user terminals; and
- an optimisation of the sharing of the resources at the level of each radio access terminal.

The protocol and the system of management of the resources of a broadband mobile network including at least prolonged fixed accesses by an array of wireless local area network radio access terminals and a broadband access server, which are subjects of the present invention, are remarkable in that this protocol consists at least of and this system enables at least, upon transmission of a request for access to an application transmitted by a prospective user mobile terminal to a specific radio access terminal, for the purpose of connection of this prospective user mobile terminal to this specific radio access terminal, discriminating on the one hand the level of radioelectric power of the signal received by the prospective user mobile terminal and on the other hand the network identifiers of the prospective user mobile terminal and of the requested application, based on this request for access, comparing the discriminated network identifiers with reference identifiers in order to ensure control of access to this broadband mobile network and, upon positive response to this comparison operation, discriminating from a reference list including this specific radio access terminal and at least one radio access terminal adjacent to this specific radio access terminal, chosen from amongst this array of radio access terminals, as a function of the location of this prospective user mobile terminal relative to this specific radio access terminal, of the traffic load of each radio access terminal of this array of radio access terminals and of the type of application required, a prospective radio access terminal for the transmission of the access request and for the execution of this application, to the advantage of this prospective user mobile terminal, by means of this broadband access server.

The protocol and the system of management of the resources of a broadband mobile network according to the invention are applicable to the transmission and the execution of real time and/or non-real-time applications by mobile terminals having a TCP/IP network link by prolonged fixed accesses by wireless local area network access terminals.

BRIEF DESCRIPTION OF THE DRAWINGS

They will be better understood upon reading of the following description and study of the drawings in which, apart from FIG. 1 which relates to the prior art.

FIG. 2b shows by way of illustration a flow diagram for implementation of the method according to the invention within the non-limiting context of the situation illustrated in FIG. 2a;

DETAILED DESCRIPTION OF THE DRAWINGS

A more detailed description of the method of management of the resources of a broadband mobile network according to the present invention, this network having at least prolonged fixed accesses by an array of wireless local area network radio access terminals and a broadband access server, will now be given in connection with FIGS. 2a, 2b and the following figures.

Figure 2A:
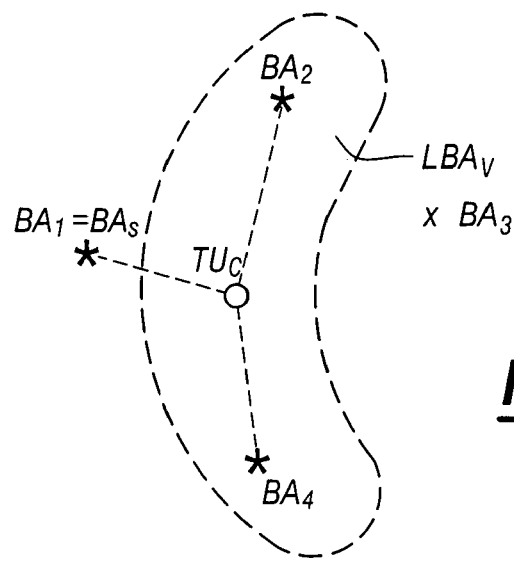
FIG. 2a shows by way of illustration a prospective user terminal for the transmission of a request for access to and execution of an application transmitted by one of the radio access terminals of an array of radio access terminals making up a wireless local area network, prolonged fixed accesses by a broadband mobile network in accordance with the subject of the present invention.

The method of management according to the present invention can be implemented in the situation in which upon transmission of a request for access to an application transmitted by a prospective user mobile terminal, denoted by $TU_c$ in FIG. 2a, to a specific radio access terminal belonging to the network in question for the purpose of connection of the prospective terminal $TU_c$ to this specific radio access terminal $BA_s$, the following operations are implemented.

With reference to the aforementioned FIG. 2a, a plurality of radio access terminals can be seen, denoted $BA_1$, $BA_2$, $BA_3$ and $BA_4$. The prospective user mobile terminal $TU_c$ is supposed to receive from certain of the aforementioned radio access terminals, and in particular from the terminal $BA_1$, the terminal $BA_2$ and the terminal $BA_4$, a radio signal of a sufficient level to permit communication with the corresponding radio access terminal.

By way of non-limiting example, the radio access terminals $BA_1$, $BA_2$ and $BA_4$ are supposed to allow the prospective user mobile terminal $TU_c$ a level of reception of the signal emitted by each of the aforementioned terminals which is sufficient in order to ensure the transmission of the request for access and the execution of the requested application with a sufficient level of quality of service QoS, in accordance with the criteria for provision of services for access to these applications.

On the other hand, the access terminal $BA_3$ is supposed not to allow reception by the client user terminal $TU_c$ of a radio signal which is sufficient for such execution.

Consequently, it is considered a priori that the request for access to an application transmitted by the prospective user mobile terminal $TU_c$ is made to the specific access terminal $BA_s$ corresponding for example to the radio access terminal $BA_1$, the specific radio access terminal being defined as such by the better level of reception of the radio signal emitted by each of the terminals $BA_1$, $BA_2$ and $BA_4$ in the example given in relation to FIG. 2a by the prospective user mobile terminal $TU_c$.

For the implementation of the method according to the present invention, there are available a priori the level of radioelectric power of the signal received by the prospective user mobile terminal $TU_c$, an electric radio signal emitted on the one hand by the specific radio access terminal $BA_s$ and by the array of adjacent radio access terminals $BA_2$ and $BA_4$ which, in opposition to the inaccessible radio access terminal $BA_3$, are said to be in direct vision of the prospective user terminal $TU_c$.

Taking into account the preceding definitions, it is pointed out that the array of radio access terminals eligible for the prospective user terminal $TU_c$ is formed by:

the specific radio access terminal $BA_s = BA_1$;

the sub-array of adjacent radio access terminals in direct vision of the prospective user terminal $TU_c$ represented by the list of radio access terminals in direct vision $LBA_v = [BA_2 | BA_4]$.

The array of eligible radio access terminals $LBA_e$ verifies the relation $LBA_e = [BA_s | LBA_v]$.

With regard to the knowledge and the availability of the levels of radioelectric power of the signal received by the prospective user mobile terminal $TU_c$, a radioelectric signal emitted by each of the radio access terminals of the aforementioned array of eligible radio access terminals $LBA_e$, it is pointed out that these data can be obtained by a process of polling from a central management unit, as will be described below.

The aforementioned polling process also makes it possible to have available all of the instantaneous throughput data of each of the aforementioned radio access terminals, and in particular:

the instantaneous throughput of the specific radio access terminal designated $R_s = R_1$;

the list of instantaneous throughputs of the sub-array of adjacent access terminals represented by $LR_v = [R_2 | R_4]$ where $R_2$ and $R_4$ of course designate the instantaneous throughput of the radio access terminals $BA_2$ and $BA_4$;

the list of throughputs of all of the eligible radio terminals designated by $LR=[R_s|LR_v]$.

The concept of instantaneous throughput covers that of mean throughput during a predetermined time period or that of throughput necessary for the execution of a predetermined application.

Finally, the aforementioned polling process makes it possible to have available data on the radioelectric power of the signal received by the prospective user mobile terminal $TU_c$ relative to the array of eligible radio access terminals, and in particular:

the radioelectric power received by the prospective user terminal from the specific access terminal, the power being designated $PW_{us}=PW_{u1}$;

the list of radioelectric powers received by the client user terminal $TU_c$ from the adjacent access terminals designated $LPW_{uv}=[PW_{u2}:[PW_{u4}]]$;

the list of all the powers received on the part of the eligible radio access terminals, the list of powers received denoted $LPW=[PWU_s:LPW_{uv}]$.

It is considered a priori that all of the data relating to the throughput of each of the aforementioned radio access terminals and radioelectric powers received by the client user terminal $TU_c$ from the aforementioned radio access terminals are available at the level of the previously mentioned management centre, as will be described later.

It is considered furthermore that all of the aforementioned data are available prior to any transmission of a request for access to an application transmitted by the prospective user mobile terminal $TU_c$ to one of the eligible radio access terminals previously mentioned.

The method of management of the resources of a broadband mobile network as described above in relation to FIG. 2a will now be described in connection with FIG. 2b.

The method according to the present invention is implemented upon transmission of a request for access denoted ar_A ($IDTU_c$, $PW_{us}$, $RA_c$).

In the aforementioned request for access $IDTU_c$ designates one or several identifiers of the client user terminal $TU_c$;

$PW_{us}$ designates the radioelectric power of the signal received by the prospective user mobile terminal $TU_c$, this radioelectric signal being emitted by the specific access terminal $BA_s$, and $RA_c$ designates a reference to the application to which access is requested by the client user terminal $TU_c$.

Finally, LPW of course designates, as mentioned previously, the list of all the powers of the radioelectric signals emitted by the previously defined eligible access terminals.

Upon transmission of the request for access to the application in question transmitted by the prospective user mobile terminal $TU_c$, in particular to the specific radio access terminal $BA_s$, the method according to the invention consists of discriminating on the one hand the level of radioelectric power of the signal emitted by the access terminal received by the prospective user mobile terminal as well as on the other hand the network identifiers of the prospective user mobile terminal $IDTU_c$ and of the requested application $RA_c$ on the basis of the transmitted request for access ar_A (.). This operation is represented at step A in FIG. 2b. As mentioned previously, the specific radio access terminal $BA_s$ is for example the one for which the client user terminal $TU_c$ receives the maximum radioelectric level of power emitted in the example given in relation to FIG. 2a by the terminal $BA_1$, the one for which the direct distance between the client user terminal $TU_c$ and the radio access terminal in question is minimal, at the very least, for which the conditions for radio transmission are the best and the attenuation is the lowest.

Figure 2B:
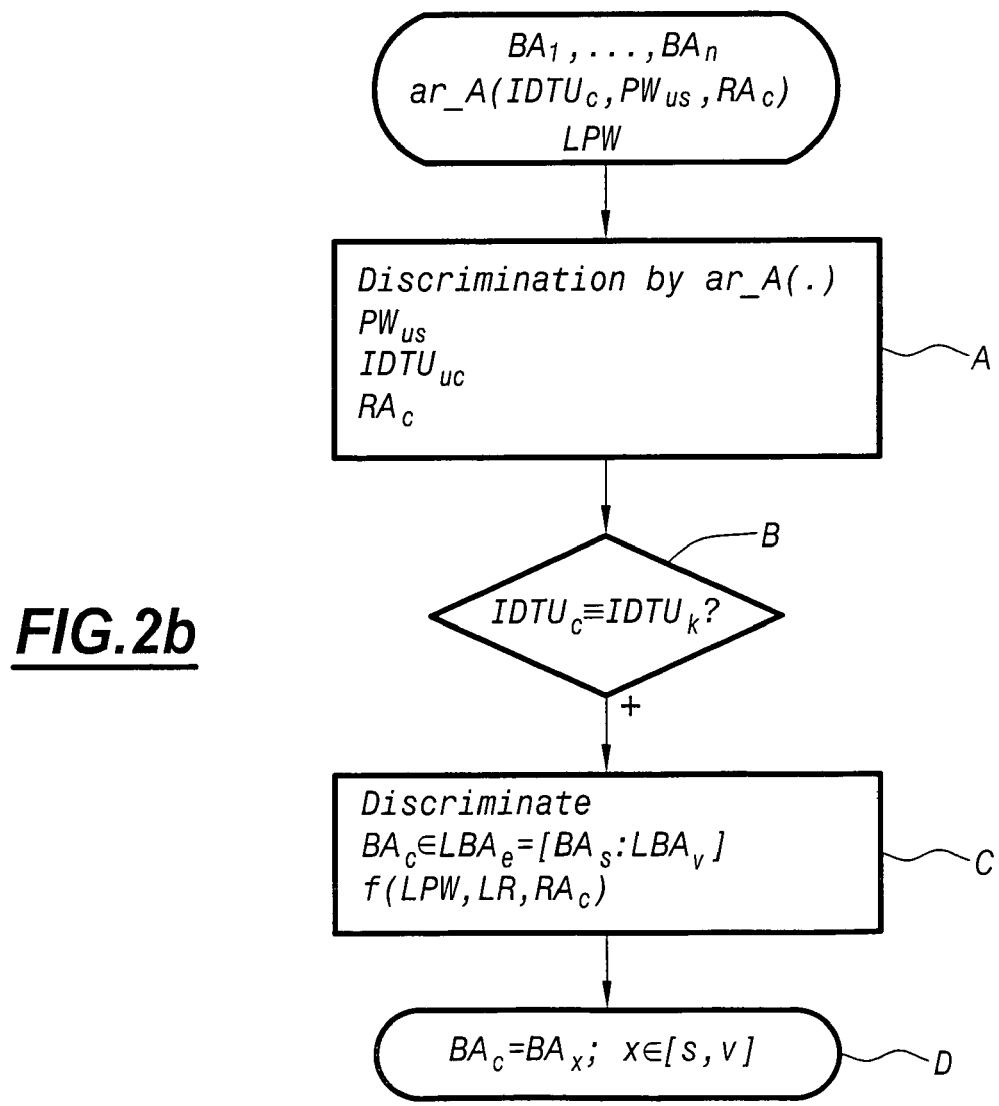

Step A is then followed by a step B which consists of comparing the discriminated network identifiers, that is to say the identifiers $IDTU_c$, with reference identifiers in order to ensure control of mobile access to the broadband network, these reference identifiers being denoted by $IDTU_R$ at the test B in FIG. 2b. The comparison operation is symbolised by the relation $IDTU_c = IDTU_r$?

Upon a positive response at the comparison step B, this latter is followed by a step C which consists of discriminating, on the basis of a reference list including the specific radio access terminal and at least one radio access terminal adjacent to this specific radio specific, an adjacent access terminal chosen from amongst the array of radio access terminals, one prospective radio access terminal for execution of the requested application $RA_c$ to the advantage of the prospective user mobile terminal $TU_c$, by means of the broadband access server with which the broadband mobile network is equipped and which is subjected to the method of management of the resources according to the invention.

With reference to FIG. 2b, it will understood in particular that the reference list of radio access terminals is advantageously constituted by the list of eligible radio access terminals $LBA_e$ previously designated in the description, that is to say the list $LBA_e=[BA_s:LBA_v]$.

The discrimination of the prospective radio access terminal for the transmission of the request for access and for the execution of the requested application $RA_c$ is effected on the reference list as a function of the location of the prospective user mobile terminal $TU_c$ relative to the specific radio access terminal, the traffic load of each radio access terminal, the list representing the array of radio access terminals, that is to say the list of eligible radio access terminals $LBA_e$ and of course the type of application requested $RA_c$.

A more detailed description of the process of discrimination in the reference list of a prospective radio access terminal for the transmission of the request for access and for the execution of the requested application will now be given in connection with FIG. 2c.

For the implementation of the discrimination step represented at step C of FIG. 2b, there are available the reference list formed by the list of eligible radio access terminals $LBA_e=[BA_s:LBA_v]$ and the function of discrimination, a function of the list of powers received by the prospective user terminal $TU_c$ of the array of aforesaid radio access terminals, the list of throughputs of each of the aforementioned radio access terminals in question, the list of throughputs denoted LR, and the reference to the requested application $RA_c$ by the client user terminal $TU_c$. This function is denoted f(LPW, LR, $RA_c$).

In accordance with a remarkable aspect of the method according to the invention, for an unavailable specific radio access terminal, using the criterion of traffic load of the latter, the aforementioned method consists of choosing as prospective radio access terminal the one for which the radio power of the signal received by the prospective user mobile terminal is the highest or of which the throughput load is the most favourable.

Figure 2C:
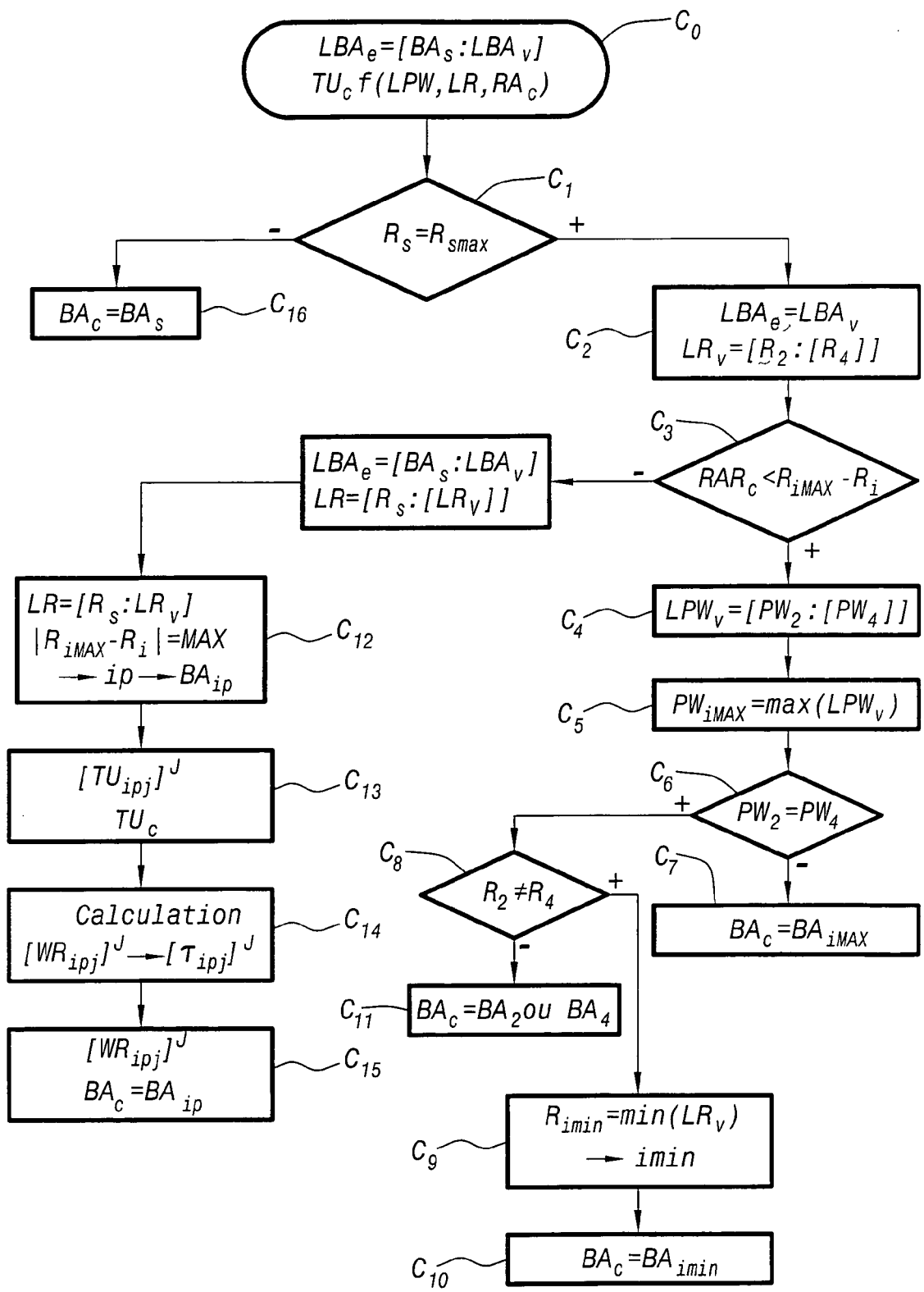
FIG. 2c shows by way of illustration a non-limiting example of a process for discrimination of a prospective radio access terminal for the transmission and the execution of a request for access to an application to the advantage of a prospective user mobile terminal, advantageously permitting in a non-limiting manner the implementation of the method which is the subject of the present invention.

For this purpose the initial step $C_o$ previously described and represented in FIG. 2c may be followed advantageously by a step $C_1$ of tests on the instantaneous throughput value of the specific radio access terminal, namely the value $R_s$, in relation to a maximum throughput value of the specific radio access terminal, the maximum value denoted $R_{sMAx}$.

Upon a negative response to the test $C_1$, the instantaneous throughput of the specific radio access terminal $B_s$ not being equal to or being less than the maximum value of the throughput of the specific radio access terminal $R_{sMAx}$, the step $C_1$ is followed by a step $C_{16}$ in which the specific radio access terminal $BA_s$ is chosen as prospective radio access terminal, this choice being symbolised by the relation $BA_c=BA_s$. Following the aforementioned step $C_{16}$ the actual process of connection between the prospective user terminal $TU_c$ and the chosen prospective radio access terminal $BA_c=BA_s$ can then be implemented according to a connection process or protocol which is not shown in the drawings and will be described later in the description.

On the other hand, upon a positive response to the test $C_1$ of FIG. 2c, when the instantaneous throughput of the specific radio access terminal is at most equal to the maximum throughput of this latter $R_{sMAX}$, it is not of course possible to retain the specific access terminal as prospective radio access terminal. This specific access terminal is of course considered as unavailable.

In these circumstances, the method according to the invention consists of choosing as prospective radio access terminal the one in which the radioelectric power of the signal is the highest or in which the throughput load is the most favourable, as represented in steps $C_2$ and following of FIG. 2c.

In this situation in step $C_2$ a reference list is considered which is formed by a simplified list of eligible radio access terminals and which by way of non-limiting example consists of the list of access terminals in direct vision $LBA_v$, the specific radio access terminal $BA_s$ being considered as unavailable. At this same step $C_2$ the list of throughputs of the access terminals in direct vision is available, that is to say the list of throughputs $LR_v=[R_2, R_4]$ in the example given in relation to FIG. 2b.

In this situation, a test step $C_3$ is called up which consists of verifying that the throughput necessary for the execution of the requested application $RA_c$, the necessary throughput being denoted $RAR_c$, is less than the difference between the maximum throughput of each admissible radio access terminal and the instantaneous throughput of the corresponding radio access terminal.

The operation of tests of step $C_3$ in FIG. 2c is represented by the relation $$R_{iMAX}-R_i>RAR_c$$

in which $R_{iMAX}$ designates the maximum throughput for the radio access terminal of index or address i belonging to the adjacent terminals of the step $C_2$, that is to say the terminals $BA_2$ and $BA_4$, $R_i$ designates the instantaneous throughputs $R_2$ and $R_4$ of the aforementioned terminals and $RAR_c$ designates the throughput necessary for the execution of the requested application $RA_c$.

Upon a positive response to the test carried out at step $C_3$, a step $C_4$ is called up in which the list of powers of the signals received by the client user terminal $TU_c$ from the eligible radio access terminals is available, that is to say the list of adjacent access terminals, the list of the aforementioned powers verifying the relation $$LPW_v=[PW_2,:PW_4]].$$

The step $C_4$ can then be followed by a step $C_5$ which consists of determining from amongst the list of aforementioned powers the maximum power amongst the power values contained in the previously mentioned list. This operation is represented at step $C_5$ by the relation $$PW_{imax}=\max(LPW_v)$$

By the aforementioned operation it is determined which is the adjacent radio access terminal $BA_2$ or $BA_4$ which delivers to the client user terminal $TU_c$ the maximum power $PW_{imax}$.

Upon a positive response at the step $C_6$, as a discrimination of the radioelectric power received by the prospective user terminal $TU_c$ cannot be effected, a test $C_8$ is called up which consists advantageously of comparing the instantaneous throughputs of the radio access terminals which constitute the eligible radio access terminals. The test executed at step $C_8$ consists for example of comparing the instantaneous throughput $R_2$ of the radio access terminal $BA_2$ and the instantaneous throughput of the radio access terminal $BA_4$, the instantaneous throughput being designated $R_4$.

Upon a negative response to the test $C_8$, the instantaneous throughputs of the adjacent radio access terminals $BA_2$ and $BA_4$ being substantially identical, either the terminal $BA_2$ or the terminal $BA_4$ is chosen as prospective radio access terminal $BA_c$. This operation is carried out at step $C_{11}$ symbolised by the relation $$BA_c=BA_2 \text{ or } BA_4.$$

On the other hand, upon a positive response to the test $C_8$, as the adjacent radio access terminals $BA_2$ and $BA_4$ do not have the same instantaneous throughput, a test operation $C_9$ is called up which consists of determining the instantaneous minimum throughput over the throughput values contained in the list of throughputs of the adjacent terminals. This operation carried out at step $C_9$ is represented by the relation $$R_{i\,min}=\min(LR_v).$$

The aforementioned step $C_9$ makes it possible to discriminate the value $_{i\,min}$ for which the throughput of the adjacent access terminal $BA_2$ or $BA_4$ is minimum.

The aforementioned step $C_9$ can then be followed by a step $C_{10}$ which consists of choosing as prospective radio access terminal $BA_c$ the radio access terminal of which the index corresponds to the index $_{i\,min}$ determined at step $C_9$. The operation of step $C_{10}$ is symbolised by the relation $$BA_c=BA_{i\,min}.$$

Upon a negative response at step $C_3$ of FIG. 2c, all the eligible radio access terminals are now unavailable.

Under these circumstances, for a sub-array of unavailable eligible radio access terminals formed by the specific radio access terminal and by a plurality of unavailable adjacent radio access terminals the situation is considered again where the list of eligible radio access terminals $LBA_e$ is formed by the array of radio terminals $LBA_e=[BA_s|LBA_v]$ and where the list of throughputs $LR=[R_s|LR_v]$ is of course available.

In these circumstances, a plurality of user mobile terminals is then connected to each of the radio access terminals which constitute the sub-array of unavailable radio access terminals. It will be understood in particular that the instantaneous throughput $R_i$ of each of the radio access terminals which constitute the sub-array of eligible radio access terminals is then sufficiently close to the value of the maximum throughput $R_{iMAX}$, $i \in [s, v]$, in order to prevent any execution of the requested application $RA_c$ which requires a necessary throughput $RAR_c$ greater than the admissible residual throughput for each radio access terminal in question.

In this situation the method according to the invention then consists of recalculating the traffic throughputs assigned to each user mobile terminal connected for at least one of the radio access terminals of the sub-array of unavailable access terminals, as a function of the conditions of access and executed application by each user mobile terminal connected, in such a way as to define a weighted traffic throughput capable of being assigned to each mobile user terminal connected. This recalculation operation is then followed by a step which consists of assigning the weighted traffic throughput to each connected user terminal in such a way as to release, for the radio access terminal of the sub-array of unavailable radio access terminals, resources of transmission in terms of traffic throughput permitting the transmission of the request for access and the execution of the requested application $RA_c$ to the advantage of the prospective user mobile terminal $TU_c$.

The operations of recalculation and allocation can then be implemented in an advantageous and non-limiting manner by the steps $C_{12}$, $C_{13}$ and $C_{14}$ represented in FIG. 2c.

At step $C_{12}$ the list of throughputs of each eligible radio access terminal having the form $LR=[R_s:LR_v]$ is available.

For i, the index or address of each radio access terminal belonging to [s,v] of the array of eligible radio access terminals, the difference in throughput is calculated for each of the radio access terminals considered eligible, the difference in instantaneous throughput in relation to the maximum throughput allowed for the corresponding radio access terminal, and the maximum value of this difference is determined.

This operation is represented symbolically by the relation $|R_{iMAX}-R_i|=$MAX.

The maximum value obtained for a radio access terminal having the index or address i is the one for which the operation of weighting and recalculation of the traffic throughputs assigned to each user mobile terminal connected will be executed, in order to cause the least possible disruption to the throughputs assigned to each of the user terminals connected. It will be understood in particular that when the aforementioned difference in throughput is maximum, the disruption caused to each of the user mobile terminals connected which are thus reassigned a lower permitted throughput is of course minimal.

The operation carried out at step $C_{12}$ makes it possible to discriminate an index $i_p$ on which the operation of recalculation of the throughputs and allocation of a weighted traffic throughput to each of the user terminals connected is carried out. This operation is symbolised at step $C_{12}$ by the relation $ip \rightarrow BA_{ip}$, the radio access terminal on which the operation of recalculation and allocation of the weighted traffic throughput is then executed. Of course, the index ip itself belongs to the array [s,v]. Step $C_{12}$ is then followed by a step $C_{13}$ in which all of the user terminals are available which are connected to the radio access terminal having the address ip on which the operation of recalculation of the weighted throughputs is going to be effected. For this reason all of the user terminals connected to the access terminal having the address ip are denoted $[TU_{ipj}]^J$, J designating the number of user terminals connected to the radio access terminal having the aforementioned index or address ip. Of course, the client user terminal $TU_c$ is also available.

Step $C_{13}$ is then followed by a step $C_{14}$ which consists of calculating the weighted traffic assigned to each of the user terminals connected, all of the weighted throughputs being denoted for this reason $[WR_{ipj}]^J$ for each of the connected terminals.

A rate of occupancy denoted $\tau_{ipj}$ of the radio access terminal $BA_{ip}$ for each of the terminals $TU_j$ connected to this latter for which the calculation of the weighted throughputs has been carried out corresponds to each assigned weighted throughput $WR_{ipj}$. The whole of the rates of occupancy is denoted $[\tau_{ipj}]$. The rate of occupancy of each of the user terminals connected to the radio access terminal for which the weighted throughputs have been calculated and reallocated can be determined as rate of occupancy of pass band for example.

Step $C_{14}$ can then be followed by a step $C_{15}$ in which on the one hand the chosen prospective radio access terminal is the one which corresponds to the radio access terminal of which the address or index corresponds to index ip and where on the other hand the throughputs assigned to each user terminal connected have been modified by the allocation of the previously calculated weighted throughputs.

This operation is symbolised by the relation $BA_c=BA_{ip}$ and $[WR_{ipj}]^J$ indicating the assignment to each of the connected terminals of a corresponding weighted value of the assigned throughput.

A preferred variant of the method according to the present invention will now be described in connection with FIG. 2d. The aforementioned variant corresponds to a situation in which for a sub-array of radio access terminals which are unavailable but eligible formed by the specific radio access terminal and by a plurality of adjacent and unavailable radio access terminals, a plurality of user mobile terminals is likewise connected to each of the radio access terminals of the sub-array in question. This situation may correspond for example to a negative response to the test $C_3$ of FIG. 2c. In this situation the list is available of the eligible radio access terminals $LBA_e=[BA_s:LBA_v]$, the prospective user terminal $TU_c$ and of course the discrimination function f(LW, LR, $RA_c$).

In this situation a test $C_{17}$ can be carried out prior to the step $C_{12}$ of FIG. 2c in order to detect one of the specific user mobile terminals denoted $TU_s$ connected to one of the radio access terminals of the sub-array of radio access terminals, that is to say represented by the list of eligible radio access terminals $LBA_e$, but in direct vision of at least one distinct adjacent radio access terminal of the sub-array of radio access terminals defined by the aforementioned reference list $LBA_e$.

Figure 2D:
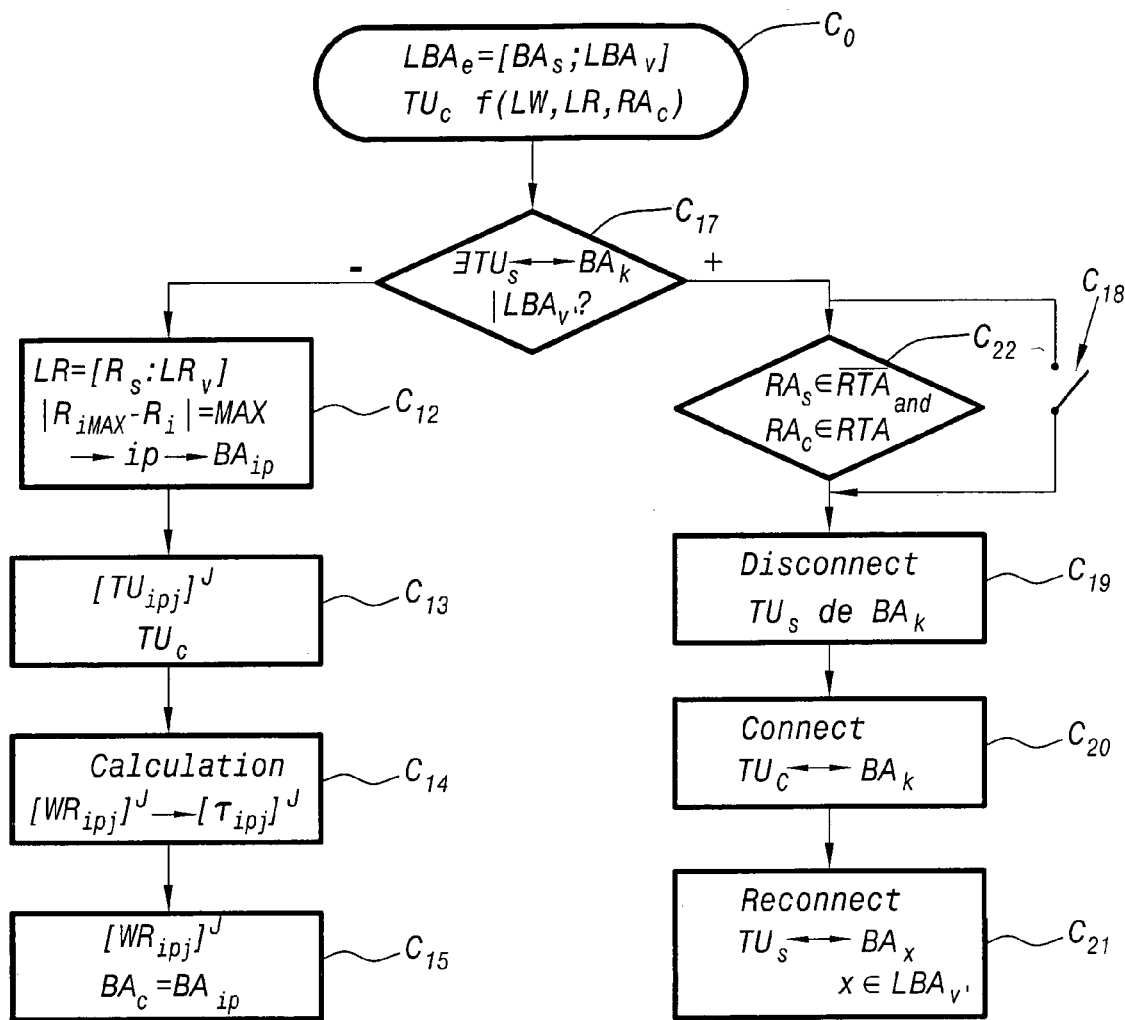
FIG. 2d shows purely by way of illustration an advantageous variant of the implementation of the process of discrimination of a prospective radio access terminal illustrated in FIG. 2c.

At the test step $C_{17}$ of FIG. 2d, the detection of the specific user mobile terminal $TU_s$ is denoted by the symbolic relation $\exists TU_s \leftrightarrow BA_k | LBA_{v'}$?

In the aforementioned symbolic relation the correspondence by double arrow of the specific user terminal $TU_s$ and the radio access terminal $BA_k$ indicates the connection of the aforementioned specific user terminal to the radio access terminal $BA_k$, $k \in [s,v]$ of the list of eligible radio access terminals $LBA_e$ and $|LBA_{v'}$ indicates the position of the specific user mobile terminal $TU_s$ relative to at least one distinct adjacent radio access terminal of the sub-array of eligible radio access terminals $LBA_e$. It will be understood here that v' does not belong to [s,v].

The aforementioned situation is produced when radio access terminals although spatially close to one another are managed by management systems of different networks, in particular by different databases, as will be described later in the description.

The step $C_{18}$ will now be considered, according to which the logic switch $C_{18}$ is closed, the step $C_{22}$ being at the time short-circuited and not executed. Step $C_{17}$ is then followed in these circumstances by a step $C_{19}$ which consists of disconnecting the specific user mobile terminal $TU_s$ from the radio access terminal of the radio access sub-array to which this specific user mobile terminal is connected or disconnecting $TU_S$ from $BA_k$ in order to cut off power from the aforementioned radio access terminal $BA_k$ and make it available.

The step $C_{19}$ can then be followed by a step $C_{20}$ which consists of connecting the prospective user terminal $TU_c$ across the radio access terminal which has had the power cut off and has thus been rendered available, that is to say the aforementioned terminal $BA_k$.

The step $C_{20}$ can then be followed by a step $C_{21}$ which consists of reconnecting the specific user terminal $TU_s$ over one of the adjacent radio access terminals distinct from the sub-array of radio access terminals, that is to say a terminal $BA_x$, x belonging this time to the radio access terminals which constitute the list of radio access terminals in relation to the terminal $TU_s$. This operation is denoted in step $C_{21}$ by the symbolic relation $$TU_s \leftrightarrow BA_x, x \in LBA_{s'}.$$

As has been represented in FIG. 2d by the existence of the logic switch $C_{18}$ according to a particularly advantageous characteristic of the method according to the present invention, the operation which consists of disconnecting the specific user mobile terminal $TU_s$ may advantageously be made conditional upon the execution of a non-real-time application by the aforementioned specific user terminal $TU_s$ when this latter is connected, and furthermore upon the request for access or execution by the prospective user terminal $TU_c$ of an application $RA_c$ constituted by a real time application. This makes it possible to prioritise the execution of the real time applications relative to the execution of the non-real-time applications which do not necessitate qualities of service or in any case characteristics of continuity of services as significant as the real time applications. In these circumstances, as represented in FIG. 2d, a test $C_{22}$ is provided which consists of determining the nature of the application executed by the specific user terminal $TU_s$ as well as the nature of the application requested and which will be executed by the prospective user terminal $TU_c$. The discrimination of the nature of these applications relates to the non-real-time nature and the real time nature respectively of these latter.

Thus the test operation carried out at step $C_{22}$ can be implemented by the opening of the logic switch $C_{18}$, the test $C_{22}$ thus being executed. As represented at step $C_{22}$ of FIG. 2d, it consists of verifying that the application $RA_s$ executed by the terminal $TU_s$ belongs to the range of non-real-time applications and that the application executed by the prospective user terminal $TU_c$, the application $RA_c$ belongs to range of real time applications.

The test operation carried out at step $C_{22}$ is represented by the symbolic relation $$RA_s \in \overline{RTA} \text{ and } RA_c \in RTA$$

$\overline{RTA}$ designating a list of non-real-time applications and RTA designating a list of real time applications.

Finally, a more detailed description of the step $C_{14}$ of FIG. 2c which consists of recalculating the traffic throughputs assigned to each user terminal $T_j$ connected and consuming a throughput $R_{ij}(RA_j, a_j)$ in connection with a given radio access terminal $BA_i$ will now be given in connection with FIG. 2e. The throughput consumed $R_{ij}(RA_j, a_j)$ is a function of the application $RA_j$ executed and the conditions of access to the network $a_j$.

With reference to the aforementioned figure, consideration will be given to the initial situation of each of the terminals $TU_j$ connected to the access terminal $BA_i$ and consuming the throughput $R_{ij}(RA_j, a_j)$. The operation which consists of recalculating the traffic throughputs can include, as represented in FIG. 2e, a step $C_{141}$ of attributing to each connected user mobile terminal $TU_j$ a coefficient of priority of transmission as a function of the conditions of access and the application executed, the conditions of access being denoted $a_j$ and corresponding of course to the conditions of subscription or, more particularly, network access in terms of pass band and network capacity assigned to the terminal $TU_j$ in question. The application executed $RA_j$ of course determines the instantaneous throughput consumed by the terminal $TU_j$ connected to the corresponding radio access terminal $BA_i$. The coefficient of priority of transmission is a so-called coefficient of weighting, which is denoted $w_j(RA_j, a_j)$. The step $C_{141}$ can then be followed by a step $C_{142}$ which effects the weighting of the traffic throughput assigned and consumed by each connected mobile terminal as a function of the coefficient of priority of transmission assigned according to the given relation at the step $C_{142}$ of FIG. 2e $$WR_{ij} = R_{ij} \times w_j(RA_j, a_j)$$

In the preceding relation it will be recalled that $R_{ij}$ designates the instantaneous throughput consumed by the user terminal $TU_j$ connected to the radio access terminal $BA_i$ and $w_j$ designates the coefficient of priority, between 0 and 1 for example, assigned to the terminal $TU_j$ at the step $C_{141}$ described above.

A more detailed description of a system of management of the resources of a broadband mobile network, this network including at least fixed accesses prolonged by an array of wireless local area network radio access terminals and a broadband access server according to the present invention, will now be described in connection with FIG. 3a and the following figures.

Figure 1:
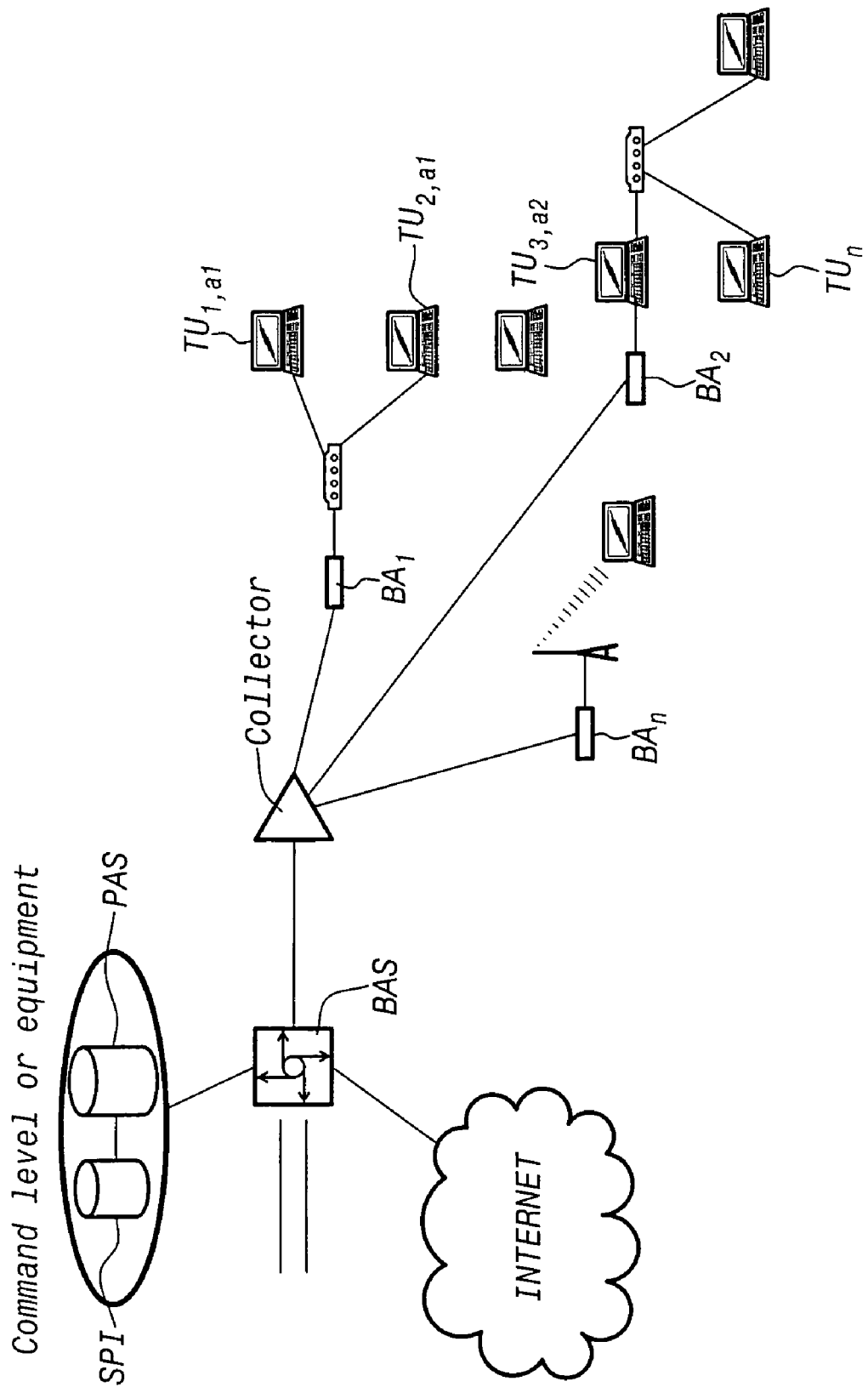

In general, it will be recalled that the system of management of the resources of a broadband mobile network according to the invention is integrated into a broadband mobile network as represented in FIG. 1 and of course includes all the functional and/or hardware elements.

The system according to the invention is remarkable in that it further includes, interconnected with the broadband access server BAS, a module CM for connection, for conditional transmission of the request for access ar_A (.) and for execution of the application to the advantage of a prospective user mobile terminal $TU_c$.

The command module CM includes at least, in a conventional manner, a central computer unit CPU, a working memory RAM, interconnected with the broadband access server BAS.

These elements of a conventional type will not be described in detail. The command module CM is installed in a network and interconnected with the broadband access server BAS, wherein the installation location can be anywhere in relation to this latter but preferably in the vicinity of the broadband access server for example.

Figure 3A:
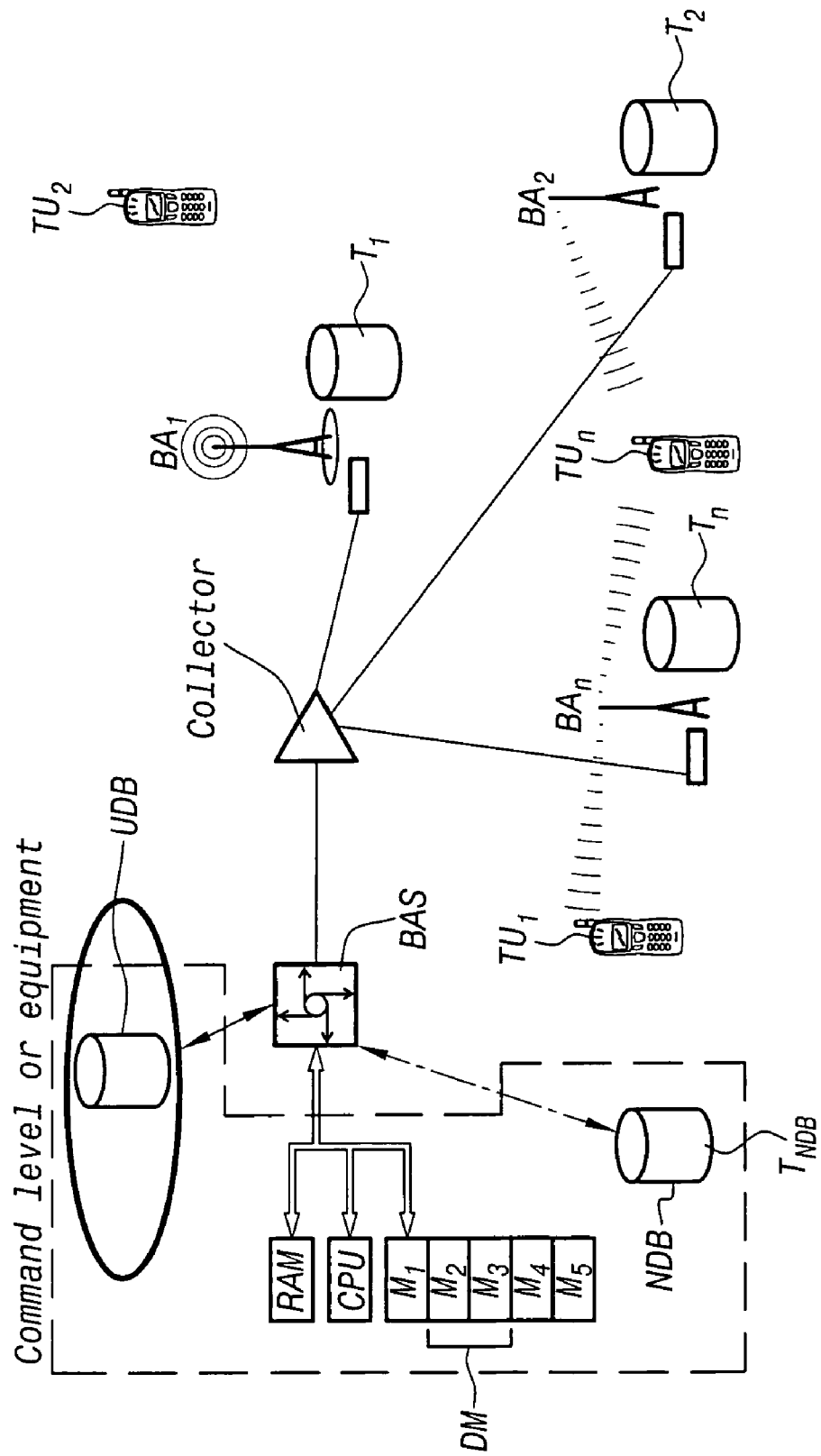
FIG. 3a shows by way of non-limiting example the architecture of a system for management of the resources of a broadband mobile network including prolonged fixed accesses by the wireless local area network access terminals, in accordance with the subject of the present invention.

As represented in FIG. 3a, the command module CM further includes a module $M_1$ for discrimination, on the basis of the request for access ar_A (.), network identifiers of the prospective user mobile terminal and the application $RA_c$ requested by this latter as well as the numerical value representing the radioelectric power of the signal received by the aforementioned prospective user mobile terminal, emitted in particular by the specific radio access terminal $BA_s$, as described previously in the description.

The command module CM further includes, as represented in FIG. 3a, an executable decision-making module DM including at least a module $M_2$ for comparison of the discriminated network identifiers with reference identifiers in order to ensure control of access to the broadband mobile network. It also includes an executable discrimination module $M_3$ which can be called up upon a positive response of the comparison module $M_2$ referred to above.

From a reference list formed from the specific radio access terminal $BA_s$ and at least one adjacent radio access terminal, that is to say in direct vision of the prospective user terminal $TU_c$, as a function of the location of the prospective user mobile terminal relative to the specific radio access terminal, the traffic throughput load of each radio access terminal of the array of adjacent radio access terminals and the type of applications requested, the executable discrimination module $M_3$ enables the discrimination of a prospective radio access terminal of this array of radio access terminals for the transmission of the request for access and the execution of the requested application to the advantage of the prospective user mobile terminal by means of the broadband access server.

It will be understood in particular that the discrimination modules, executable decision-making modules DM and the comparison modules $M_2$ and discrimination modules $M_3$ are then hierarchised and represented by directly executable software modules directly called up by the central unit CPU for execution in working memory RAM, in accordance with the previously described method according to the invention.

As has also been represented in FIG. 3a, it is pointed out that the module $M_1$ for discrimination of the network identifiers of the prospective user mobile terminal, that is to say the identifiers $IDTU_c$, advantageously include at least one user database UDB including the reference network identifiers $IDTU_R$ and the conditions of access of each prospective user mobile terminal, that is to say conditions of access provided in terms of pass band network capacity and transmission throughput by any subscription $a_j$ subscribed to by the user of any user terminal $TU_j$.

Of course, the user database UDB must be understood as associated with the module $M_1$ for discrimination of the network identifiers. It will be understood in particular that the user database UDB is directly interconnected with the broadband server BAS and is not necessarily located at the level of the command module CM. Thus the discrimination module $M_1$ and the user database UDB are associated functionally.

In the same way, as represented in an illustrative manner in FIG. 3a, the executable discrimination module $M_3$ includes at last one network database denoted NDB including at least one of the characteristics of each of the radio access terminals $BA_i$ in terms of the transmission throughput load $R_i$ and the number of user mobile terminals connected for example. Moreover, directly associated with the executable discrimination module $M_3$ is a calculation module $M_4$ for discrimination of a prospective radio access terminal for the transmission of the request for access and the execution of the application to the advantage of the prospective user mobile terminal.

Figure 2E:
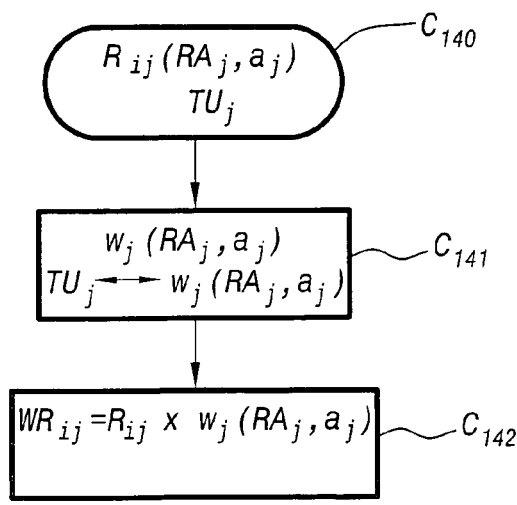
FIG. 2e shows purely by way of illustration a process for calculation and allocation of weighted traffic rate to any user terminal connected to a radio access terminal of which the instantaneous rate, relative to a plurality of user terminals connected to this latter, is substantially equal to the maximum admissible rate or if need be less than this latter, but in any case too great to allow the transmission of a request for access to and execution of an application to the advantage of any prospective user terminal not still connected to the said radio access terminal.

It will be understood in particular that the calculation module $M_4$ for discrimination advantageously has a software module which implements the steps of the flow diagrams represented in FIGS. 2c, 2d and 2e described previously in the description.

Finally, each radio access terminal designated $BA_i$ in a generic manner includes a table of data $T_i$ including at least a list $LTU_{co}$ of the network identifiers of each user mobile terminal connected to the radio access terminal $BA_i$ in question;

a list of the user terminals represented by their network identifiers, the list denoted by $LTU_{VD}$, in direct vision of the radio access terminal $BA_i$ in question and the radioelectric power received by each of the terminals in direct vision of the radio access terminal $BA_i$ in question. This list of radioelectric powers is designated $LPW_j$;

a list of the user terminals connected to the radio access terminal, of the conditions of access assigned to each of them and of the radioelectric power received by each user terminal of the radio access terminal to which each of these user terminals is connected, the list being designated by $LTU_{co}$;

a parameter of occupancy rate in terms of throughput load of the radio access terminal $BA_i$ in question, this parameter being denoted $\tau_i$ and corresponding for example to the sum of the rates of occupancy of each of the terminals connected to the radio access terminal in question, expressed in terms of output consumed by each of them relative to the aforementioned radio access terminal.

Moreover, as represented in FIG. 3a, the network database NDB advantageously includes a data table denoted $T_{NDB}$ including at least a list of the radioelectric characteristics of the different radio access terminals in terms of radioelectric characteristics, maximum admissible throughput and instantaneous throughput of these latter;

a list of the rate of occupancy $\tau_1$ of each radio access terminal;

a list of the number of user terminals connected across each radio access terminal $BA_i$;

a list of user terminals in direct vision of each radio access terminal, the list designated as $LTU_{VD}$;

a list of the user terminals having connections for access, that is to say a subscription for access but not detected by any one of the radio access terminals and therefore outset the network, this lot being denoted as $LTU_{oc}$.

It will be understood that the aforementioned lists can be obtained by concatenation of the corresponding lists available on each of the tables of data contained at the level of each of the radio access terminals $BA_i$ in question.

The present invention also relates to a data processing program, recorded on a storage medium, for the implementation of the method according to the invention, by execution by a computer, a method such as is described in connection with FIGS. 2b, 2c, 2d and 2e. The execution by a computer is understood as the execution of the steps consisting of at least discriminating on the one hand the level of radioelectric power of the signal emitted by the access terminal received by the prospective user mobile terminal and, on the other hand, the network identifiers of the prospective user mobile terminal and of the requested application, on the basis of the request for access, comparing the discriminated network identifiers with reference identifiers in order to ensure control of access to this broadband mobile network, then upon a positive response to the comparison operation discriminating, on the basis of a reference list including the specific radio access terminal and at least one radio access terminal adjacent to this specific radio access terminal, chosen from amongst this array of radio access terminals, as a function of the location of the prospective user mobile terminal, in relation to the specific radio access terminal, the traffic throughput load of each radio access terminal of this array of radio access terminals and the type of application requested, a prospective radio access terminal for the execution of this application to the advantage of the prospective user mobile terminal by means of the broadband access server.

A more detailed description of a message exchange protocol for the bidirectional transmission of information messages between the network database NDB and one of the radio access terminals, $BA_i$, transmission to a user terminal, will now be given with reference to FIG. 3b.

Figure 3B:
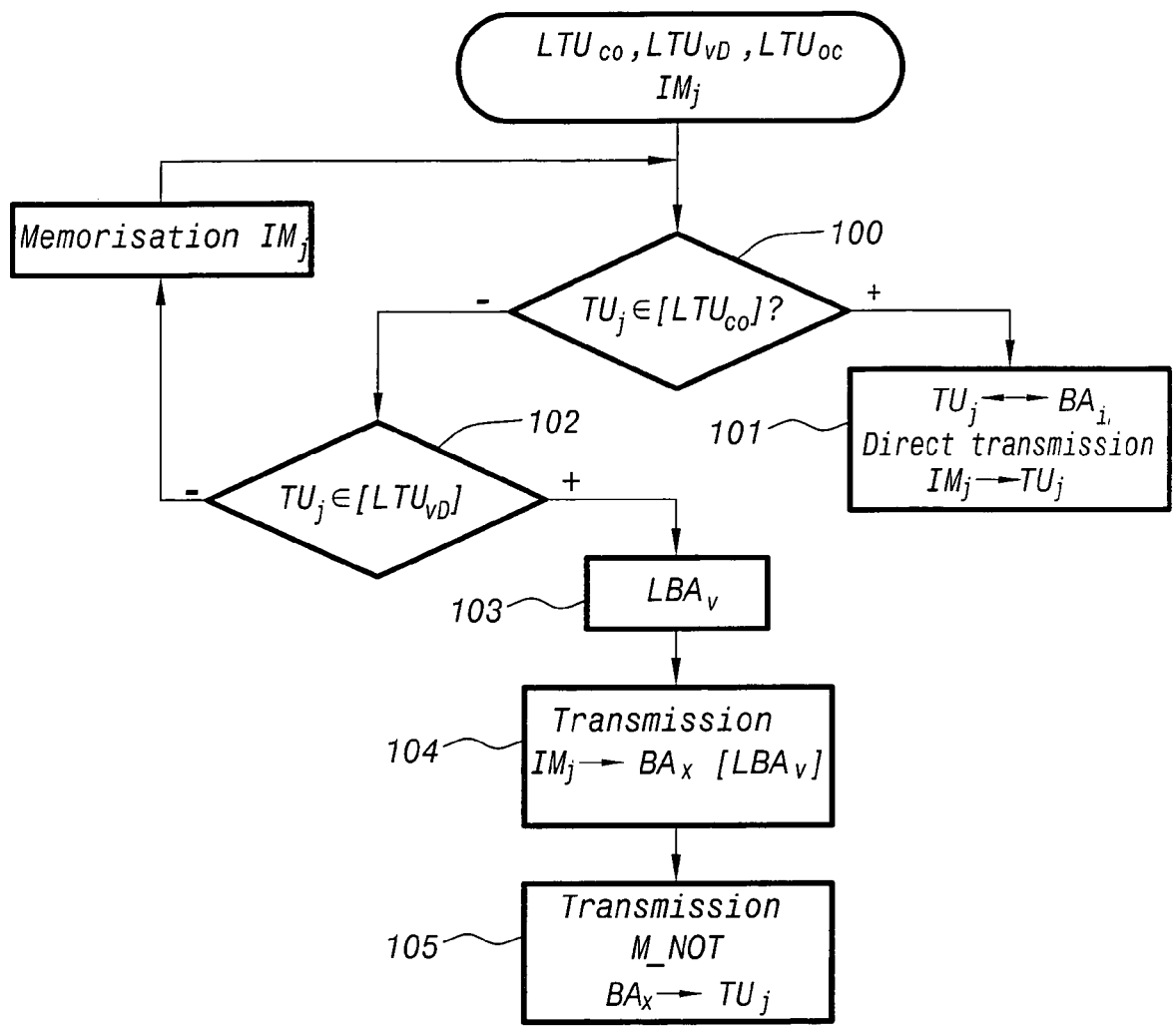
FIG. 3b shows by way of illustration a flow diagram of the protocol for bidirectional transmission of information messages between the network database and one of the radio access terminals which make up the system for management of resources of a broadband mobile network which is the subject of the present invention.

For the implementation of the aforementioned protocol represented in FIG. 3b the initial situation is considered in which there are available the list of user terminals $LTU_{co}$ connected to the radio access terminal in question, the list of user terminals in direct vision of the radio access terminal in question, namely the list $LTU_{VD}$, and the list of user terminals having conditions of access but not detected by any one of the radio access terminals and therefore outside the network, namely the list $LTU_{oc}$. The information message to be transmitted from the network database NDB to the radio access terminal in question $BA_i$ and finally to a given user terminal is denoted $IM_j$, where j designates the effective address of the user mobile terminal in question.

As represented in FIG. 3b, in the descending direction from the network database NDB to the radio access terminal $BA_i$ the message transmission protocol consists of documenting and discriminating the user mobile terminal $TU_j$ in the list of connected users $LTU_{co}$ at the test step 100 represented in FIG. 3b The test step is represented by the relation $$TU_j \in [LTU_{co}]?$$

Upon a positive response to the discrimination of connection of the user terminal $TU_j$, that is to say a positive response to the test 100 of FIG. 3b, in a step 101 the transmission protocol then consists of directly transmitting the information message $IM_j$ to the user terminal $TU_j$ via the radio access terminal to which the discriminated user terminal $TU_j$ is connected.

Otherwise, upon a negative response to the test 100 of FIG. 3b, as the user mobile terminal $TU_j$ is not in connected mode, in a test step 102 the protocol then consists of discriminating the user terminal $TU_j$ in the list of user terminals which are not connected but are in direct vision of at least one adjacent radio access terminal.

The test step 102 is represented by the symbolic relation $$TU_j \in [LTU_{VD}].$$

Upon a positive response to the test 102, which is a test for discrimination of potential connection of the prospective user terminal to at least one of the adjacent access terminals, in step 103 the list of adjacent access terminals $LBA_v$ is available and in step 104 the information message $IM_j$ is transmitted from the network database NDB to at least one of the adjacent radio access terminals.

The aforementioned transmission operation is represented by the symbolic relation $$IM_j \rightarrow BA_x \in [LBA_v].$$

The step 104 is then followed by a step 105 which consists of transmitting from one of the adjacent radio access terminals having the information message available, that is to say the terminal $BA_x$ determined at step 104, a message of notification of connection, denoted M_NOT, to the discriminated user terminal $TU_j$.

The discriminated user terminal $TU_j$ is then capable of proceeding to change to connected mode relative to the adjacent radio access terminal $BA_x$ determined in step 104 upon a corresponding instruction from the user of this latter.

On the other hand, upon a negative response to the test 102 of FIG. 3b, the user terminal is documented as outside the network.

In this situation the protocol according to the invention represented in FIG. 3b consists in a step 106 of memorising the information message $IM_j$ in the network database NDB pending the change of the discriminated user terminal $TU_j$ to connected mode or to unconnected mode but in direct vision of at least one adjacent radio access terminal.

The transmission procedure is then relaunched by returning to the test of step 100 in order to detect the change of the aforementioned discriminated user terminal $TU_j$ to connected mode or to unconnected mode but in direct vision of at least one adjacent radio access terminal. The operation of relaunching the procedure is symbolised in FIG. 3b by the return from the step 106 to the test of step 100.

For the transmission of messages from any radio access terminal $BA_i$ to the network database NDB, an advantageous procedure may consist of periodically transmitting information messages containing the information items contained in the data table $T_i$ of the radio access terminal $BA_i$ in question. The period of transmission of these messages may be determined as a function of the scale of the traffic, the load of the radio access terminal in question in terms of throughput or as a function of other parameters.

A protocol for transmission of information messages between a radio access terminal $BA_i$ and the user terminal $TU_j$ will now be described in connection with FIGS. 3c and 3d.

Figure 3C:
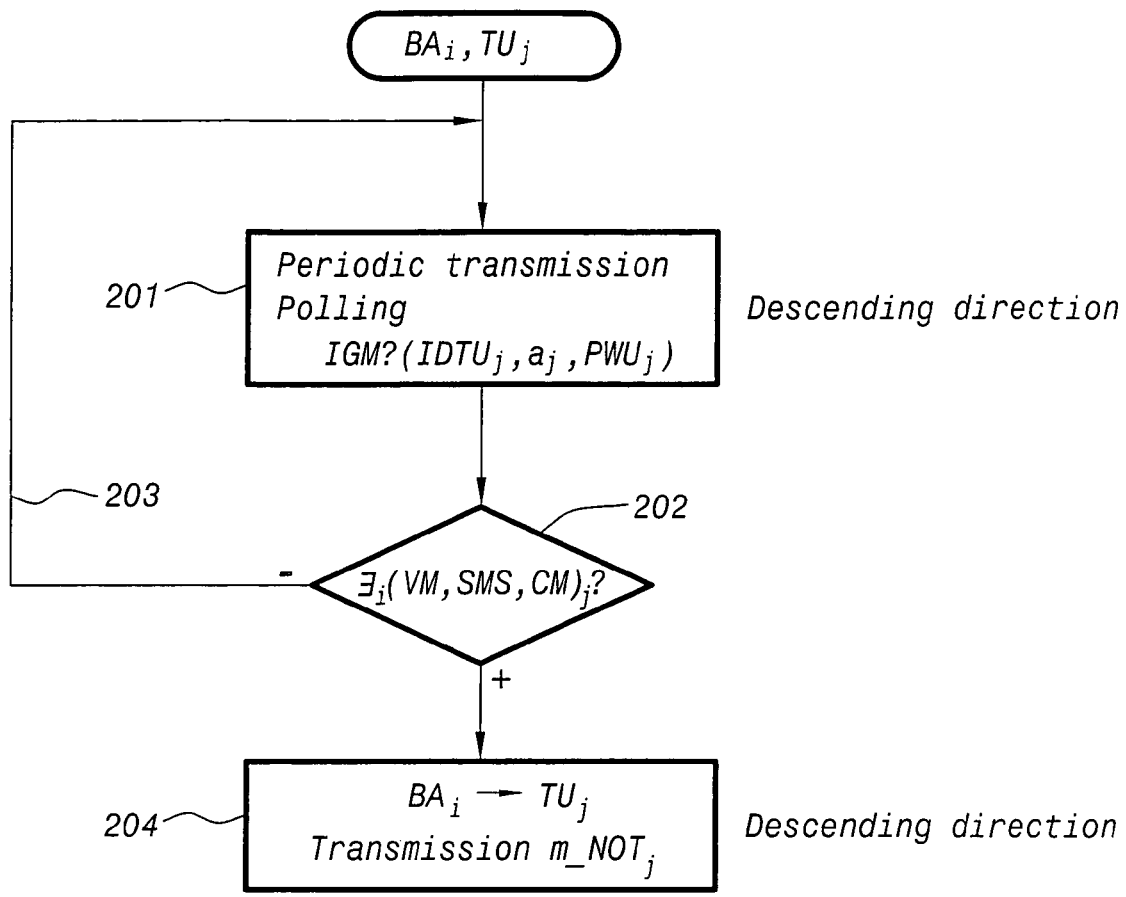
FIG. 3c shows by way of illustration a flow diagram of the protocol for transmission of information messages in the descending direction between a radio access terminal forming part of the broadband mobile network and a user terminal.

With reference to the aforementioned FIG. 3c, the initial situation is considered in which a radio access terminal $BA_i$ must enter into communication in the descending direction with a user terminal $TU_j$.

The radio access terminal $BA_i$ must enter into communication with any terminal $TU_j$ in different situations, in particular in the descending direction the radio access terminal/user terminal represented in FIG. 3c.

With reference to the aforementioned figure, the transmission of messages can then consist in a step 201 of transmitting messages for collection of information relating to the user terminals $TU_j$ situated in direct vision of the radio access terminal $BA_i$.

These collection messages comprise the request for transmission by each user terminal of identifier information of the user terminal, conditions of access to the network and radioelectric power of reception. This operation consists of a periodic transmission of the "polling" type, the messages for collection of information being denoted IGM ? ($IDTU_j$, $a_j$, $PWU_j$).

It will be recalled that $IDTU_j$ designates the identifiers of the user terminal $TU_j$, $a_j$ designates the conditions of access in terms of network capacity allocated to the terminal $TU_j$ as a function of the subscription of this latter;

$PWU_j$ designates the power of the radioelectric signal received by the terminal $TU_j$ and coming from the access terminal $BA_i$. The aforementioned parameters are transmitted by a message of response to the aforementioned messages for collection of information comprising the aforementioned fields $IDTU_j$, $a_j$ and $PWU_j$.

Upon a positive response to the test 202 indicating the existence at the level of the radio access terminal $BA_i$ of pertinent messages VM, SMS, CM in relation to the user terminal $TU_j$, these pertinent messages being memorised at the level of the radio access terminal $BA_i$, a step 204 is called up in order to execute, in the descending direction from the radio access terminal $BA_i$ to the user terminal $TU_j$, the transmission of a message of notification of connection in order that the aforementioned user terminal $TU_j$ should be capable either of responding to an incoming call or recovering the pertinent information which concerns it. At the step 204 of FIG. 3c the operation of transmission of the message of notification of connection is denoted $$BA_i \rightarrow TU_j$$

Transmission m_$NOT_j$ where m_$NOT_j$ designates the message of notification of connection addressed to the user terminal $TU_j$.

Of course, upon a negative response to the test 202 denoted "∃ i (VM, SMS, CM)$_j$", a return 203 makes it possible to go back to the step 201 in order to continue the process of transmission of messages as described and thus to ensure the monitoring of the occurrence of a message with pertinent information in relation to the terminal $TU_j$ in question.

Figure 3D:
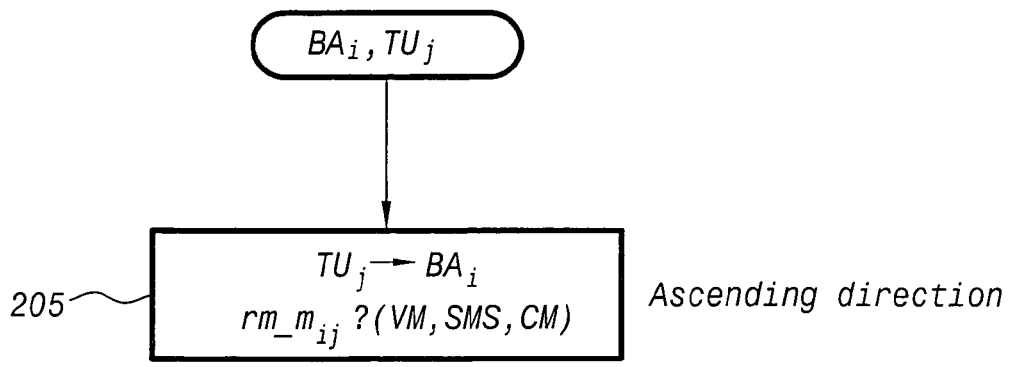
FIG. 3d shows by way of illustration a flow diagram of the protocol for transmission of information messages in the ascending direction between a radio access terminal forming part of the broadband mobile network and a user terminal.

Moreover, as represented in FIG. 3d the transmission of messages, in the ascending direction from each user mobile terminal to any radio access terminal $BA_i$ in direct vision but in the absence of connection of this user terminal relative to this radio access terminal, consists in a step 205 of transmitting periodic request messages to any radio access terminal in direct vision in order to determine the existence of pertinent information messages in relation to the user terminal $TU_j$ in question and memorised at the level of the aforementioned radio access terminal $BA_i$. The user terminals $TU_j$ are the user terminals which are not connected but are in direct vision of the terminal $BA_i$. In general, it will be recalled that the pertinent information messages in relation to the user terminal $TU_j$ concern any message such as a voice message VM, a short text message denoted SMS and e-mail or even a missed call message in the case where the terminal $TU_j$ is a mobile telephone terminal for example. This type of message is designated CM.

The transmission operation represented at step 205 of FIG. 3d is represented by the symbolic relation $$TU_j \rightarrow BA_i$$

$$rm\_m_{ij} ?(VM, SMS, CM).$$

In the preceding notation, $rm\_m_{ij}$ designates the periodic request message launched in order to determine the existence of pertinent information messages VM, SMS or CM previously mentioned.

Finally, it is pointed out that the step 201 can be deleted. In this situation the transmission of messages comprising the fields $IDTU_j$, $a_j$ and $PWU_j$ in the ascending direction can be executed periodically, each terminal transmitting this type of message in an autonomous manner.

A more detailed description of an actual protocol for connection of a user terminal to a broadband mobile network having at least prolonged fixed accesses by an array of wireless local area network radio access terminals and a broadband access server, the entire system arrangement being equipped with a system of management of the resources of this network, as described above in connection with FIGS. 3a to 3c, will now be given in connection with FIG. 4a and the following figures.

In this situation a user terminal is considered, namely the user terminal $TU_1$, which constitutes the prospective user terminal $TU_c$ as described previously in the description and has satisfied one of the criteria for choice of the radio access terminal $BA_n$ which constitutes the prospective radio access terminal for the aforementioned prospective user terminal $TU_j$.

Figure 4A:
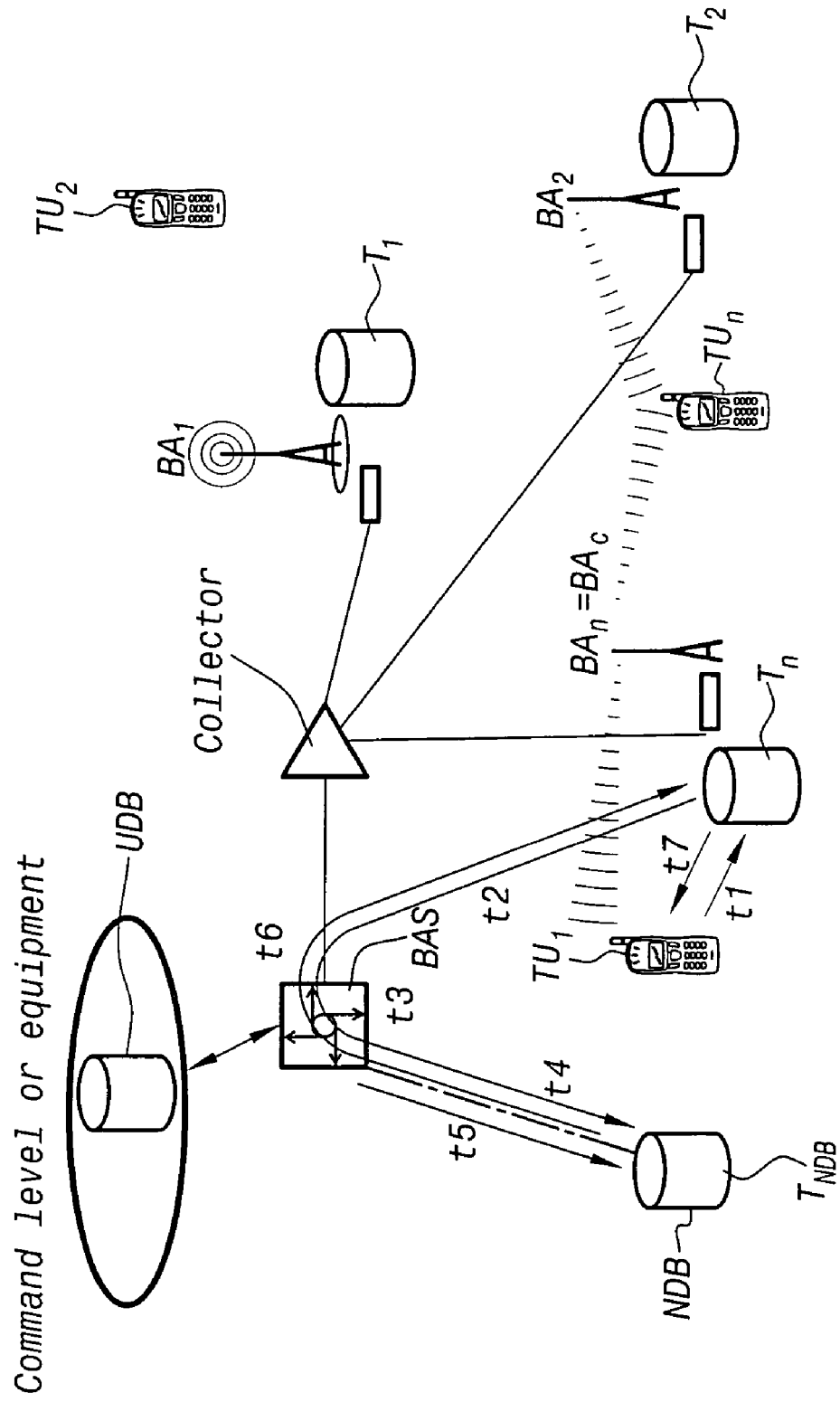
FIG. 4a shows by way of illustration a space-time diagram of a protocol for connection of a user mobile terminal to the radio access terminal of a broadband mobile network equipped with a system for management of the resources of this broadband mobile network in accordance with the object of the invention, as described in connection with FIGS. 3a to 3c, when this user terminal is in the mode connected to this radio access terminal.

It will be understood in particular that the method according to the invention having been implemented, the step consisting of discriminating one of the radio access terminals as prospective radio access terminal for the transmission of the request for access and the execution of the application to the advantage of the prospective user mobile terminal $TU_j$ is then followed by a step of redirection of the flow towards the prospective user mobile terminal executed by the broadband access server BAS in order to permit the connection of this prospective user mobile terminal to the broadband mobile network by means of the retained prospective radio access terminal, that is to say in the case of FIG. 4a the terminal $BA_c = BA_n$ for access to the requested application and execution of this latter.

Consequently it is considered that the user terminal $TU_1$ of FIG. 4 which constitutes the prospective user terminal $TU_c$ as mentioned previously is then in connected mode in relation to the radio access terminal $BA_n$ which constitutes the prospective radio access terminal.

With reference to FIG. 4a, it is pointed out that the actual connection protocol can consist at the level of the prospective radio access terminal $BA_n$ of updating in the table of data $T_n$ of the radio access terminal in question the list of connected user terminals on the basis of the parameters of the radioelectric power received by this user terminal and the conditions of access allocated to the user terminal $TU_1$ which constitutes the prospective user terminal. In FIG. 4a, the operation of connection of the prospective user terminal $TU_j$ to the access terminal $BA_n$ is represented by the transaction t1 and the operation of updating in the table $T_n$ is represented by the operation t2.

The aforementioned updating operation t2 can then be followed by a transaction t3 which consists of transmitting the aforementioned data table $T_n$ from the prospective radio access terminal $BA_c$ to the network database NDB. This operation is illustrated by the transaction t3 towards the broadband access server BAS then by the transaction t4 between the broadband access server BAS and the network database NDB.

At the level of the network database NDB the connection protocol then consists of updating the data table of this latter by updating the parameters of occupancy rate $\tau_n$ of prospective radio access terminal, the number of user terminals connected across this latter and the list of user terminals connected across it.

The actual connection protocol is followed by an operation executed at the level of the network database NDB, this operation consisting of discriminating the functional position of the prospective user terminal $TU_c$ by this latter belonging to the list of connected user terminals, namely the list $LTU_{co}$ previously mentioned in the description.

Using the criterion of the prospective user terminal $TU_j$ belonging to the aforementioned list, the connection protocol is followed by an operation consisting of transmitting from the network database NDB to the prospective radio access terminal a message of notification of calling the connected prospective user terminal. This operation is represented by the transaction t6 in FIG. 4a and is of course carried out by means of the broadband server BAS, the collector circuit and of course the prospective radio access terminal $BA_c = BA_n$.

At the level of this latter, the actual connection protocol is followed by the transmission to the prospective user terminal $TU_j$ of a call notification message, this operation being illustrated by the transaction t7 in FIG. 4a.

The connection protocol illustrated in connection with FIG. 4a can be implemented when in particular one single network database NDB is used.

Figure 4B:
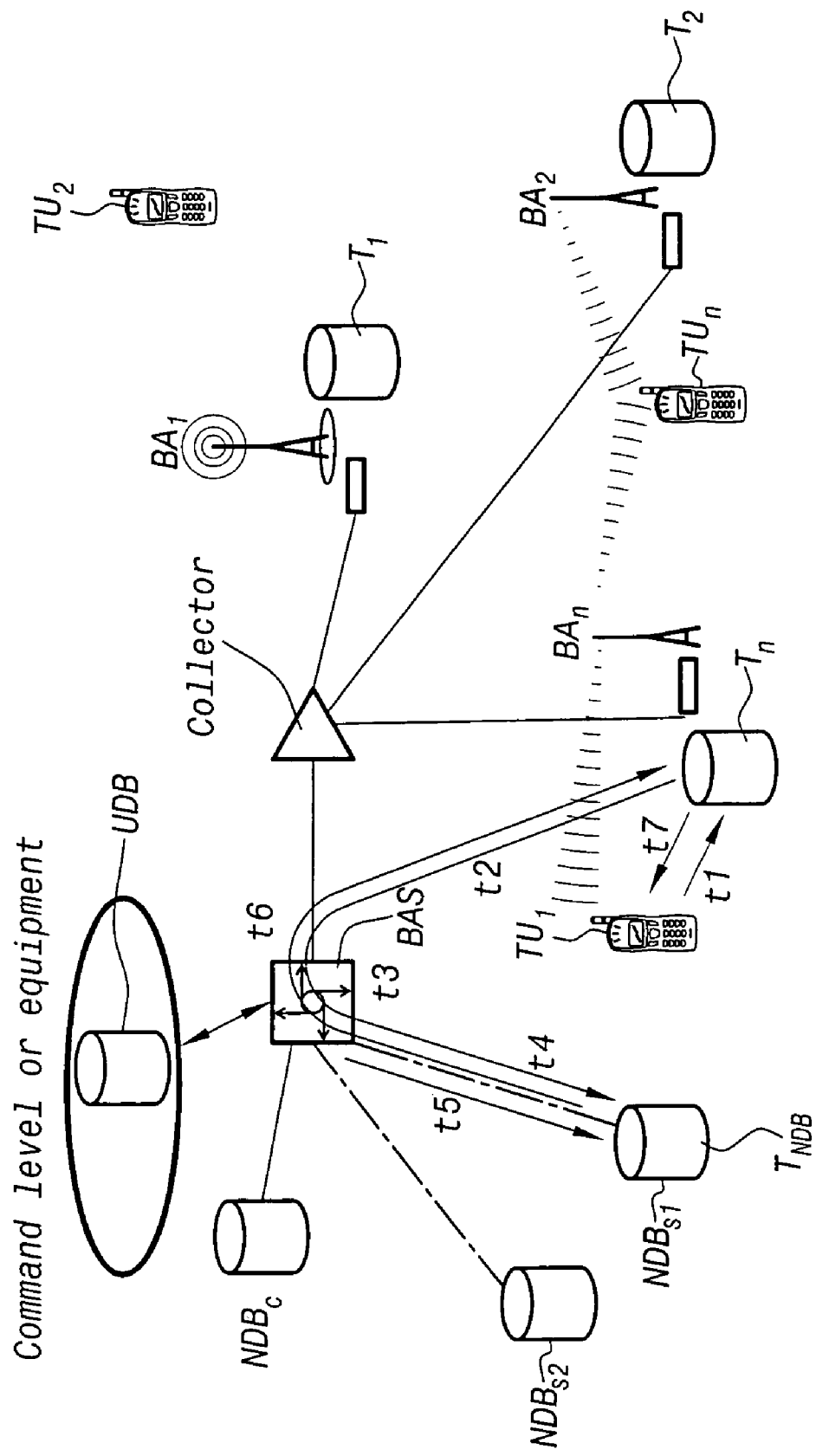
FIG. 4b shows by way of illustration a space-time diagram of a protocol for connection of a user mobile terminal to the radio access terminal in the case of an architecture of a system of management of the resources of a broadband mobile network including prolonged fixed accesses by wireless local area network access terminals, in a non-limiting embodiment in which the network database is advantageously subdivided into a central network database with which is associated a plurality of secondary network databases subjugated to this latter.

It can also be implemented when the network database NDB, as represented in FIG. 4b, is constituted by a central network database, denoted $NDB_c$, which is of course interconnected with the broadband access server BAS with which are associated a plurality of secondary network databases denoted $NDB_{s1}$ and $NDB_{s2}$ respectively in FIG. 4b.

Thus it will be understood that the central network database $NDB_c$ and the secondary network databases are interconnected with the broadband access server by a network and can therefore be located at any locations.

Figure 4C:
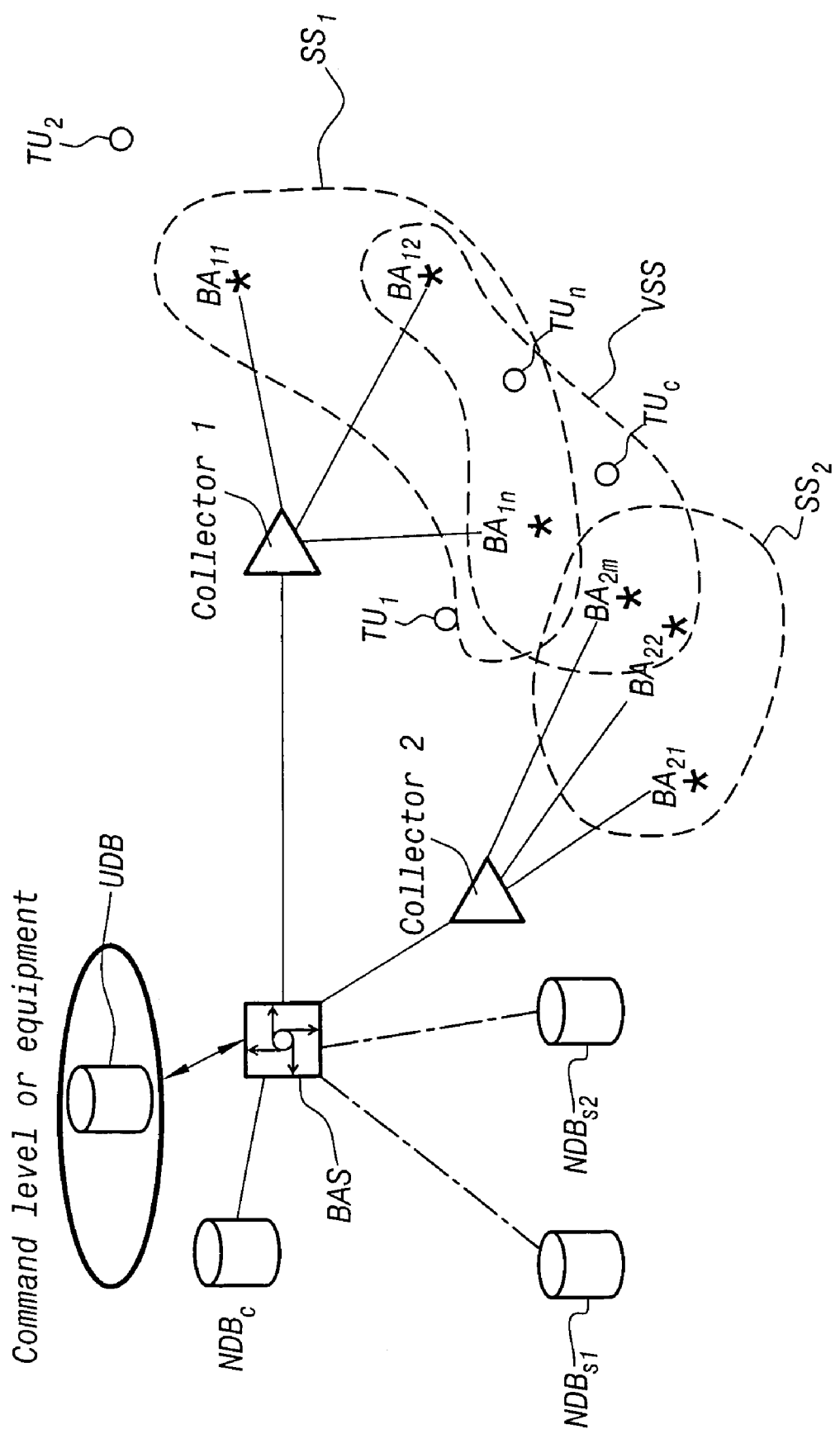
FIG. 4c shows an advantageous variant of implementation of the connection protocol illustrated in FIG. 4b making it possible to bring about an optimisation of the management of the network resources when these latter, in particular the radio access terminals, are subdivided into discrete sub-assemblies of radio access terminals, each managed by a secondary network database under the authority of a central network database.

However, and in accordance with a remarkable aspect of the system of management of the resources of a broadband mobile network according to the present invention, it is pointed out that each secondary network database advantageously has associated with it a sub-array of radio access terminals, the sub-arrays of radio access terminals being discrete, as represented in particular in FIG. 4c.

The aforementioned FIG. 4c shows, in the same manner as in the case of FIG. 4b, a system of management of the resources of a broadband network according to the present invention, including a central network database $NDB_c$ and a first and a second secondary network database $NDB_{s1}$ and $NDB_{s2}$. In FIG. 4c the different radio access terminals are represented by a cross in order to simplify the representation.

With reference to FIG. 4c, a first sub-array of radio access terminals $BA_{11}$, $BA_{12}$ and $BA_{1n}$ is intended to constitute a first sub-assembly of radio access terminals denoted $SS_1$.

A second sub-assembly of radio access terminals in question denoted $SS_2$ is intended to comprise the radio access terminals $BA_{21}$, $BA_{22}$ and $BA_{2m}$. The two sub-arrays of radio access terminals $SS_1$ and $SS_2$ are discrete because although they are connected to the same broadband access server BAS they are connected by way of collector denoted respectively as collector 1 or collector 2, each of these sub-arrays of radio access terminals $SS_1$ and $SS_2$ being managed independently by a secondary network database, namely the secondary network database $NDB_{s1}$ or the secondary network database $NDB_{s2}$ respectively. However, the central network database $NDB_c$ makes it possible to manage the arrays of radio access terminals, and in particular the sub-arrays of radio access terminals, by means of the aforementioned secondary network databases.

More specifically, because of the independence of the management of the sub-arrays of radio access terminals $SS_1$ and $SS_2$, the step which consists of transmitting a message of notification of calling the connected user terminal $TU_c$ to the prospective radio access terminal $BA_c$ is then executed between the pertinent secondary database managing the sub-array of radio access terminals in which the prospective radio access terminal $BA_c$ is integrated.

However, the connection protocol according to the present invention makes it possible with reference to FIG. 4c to manage the process of selection of any prospective radio access terminal $BA_c$ in the most flexible manner when in particular the prospective user terminal $TU_c$ is likely to be taken on by one or the other of the discrete sub-arrays $SS_1$ and $SS_2$ of radio access terminals.

This situation arises when, for a prospective user terminal $TU_c$ as represented in FIG. 4c, this latter requests an access to an application and to a connection relative to a first sub-array of radio access terminals and when the aforementioned prospective user terminal is in direct vision of at least one adjacent radio access terminal separate from the first sub-array of radio access terminals but the separate adjacent radio access terminal or terminals belong to another, second sub-array of radio access terminals and consequently managed by another secondary network database.

It will be understood in particular that in the case of FIG. 4c the prospective user terminal $TU_c$ is for example capable of transmitting its request for access to the radio access terminal $BA_{1n}$, to the radio access terminal $BA_{12}$ of the first sub-array of radio access terminals $SS_1$ as well as to the radio access terminals $BA_{2m}$ and $BA_{22}$ of the second sub-array of radio access terminals $SS_2$. It will also be understood that in these circumstances one of the radio access terminals, the radio access terminal $BA_{1n}$, is for example considered as the specific radio access terminal $BA_s$ for the radio access terminals concerned by the request for access transmitted by the prospective user terminal $TU_c$.

In these circumstances and in accordance with an advantageous aspect of the connection protocol according to the present invention, this can consist at least of forming from the sub-array of radio access terminals $SS_1$ and the other sub-array of radio access terminals $SS_2$ a virtual sub-array of radio access terminals VSS constituted by joining some of the radio access terminals of the first sub-array of radio access terminals $SS_1$ and adjacent radio access terminals belonging to the other sub-array of radio access terminals $SS_2$.

With reference to FIG. 4c, it is pointed out that the virtual sub-array of radio access terminals VSS then advantageously includes the radio access terminal $BA_{1n}$ considered for example as the specific radio access terminal, the radio access terminal $BA_{12}$ as well as the adjacent radio access terminals $BA_{2m}$ and $BA_{22}$ belonging to the second sub-array of radio access terminals $SS_2$.

The connection protocol then consists of subjecting the prospective user terminal $TU_c$ to a protocol for connection to one of the radio access terminals constituting the virtual sub-array of radio access terminals by way of the secondary network database $NDB_{s1}$ and the second secondary network database $NDB_{s2}$ under the control of the central network database $NDB_c$ in accordance with the method of management of the network resources of a broadband mobile network as described previously in the description, this method now being applied to the virtual sub-array of radio access terminals VSS.

Figure 4D:
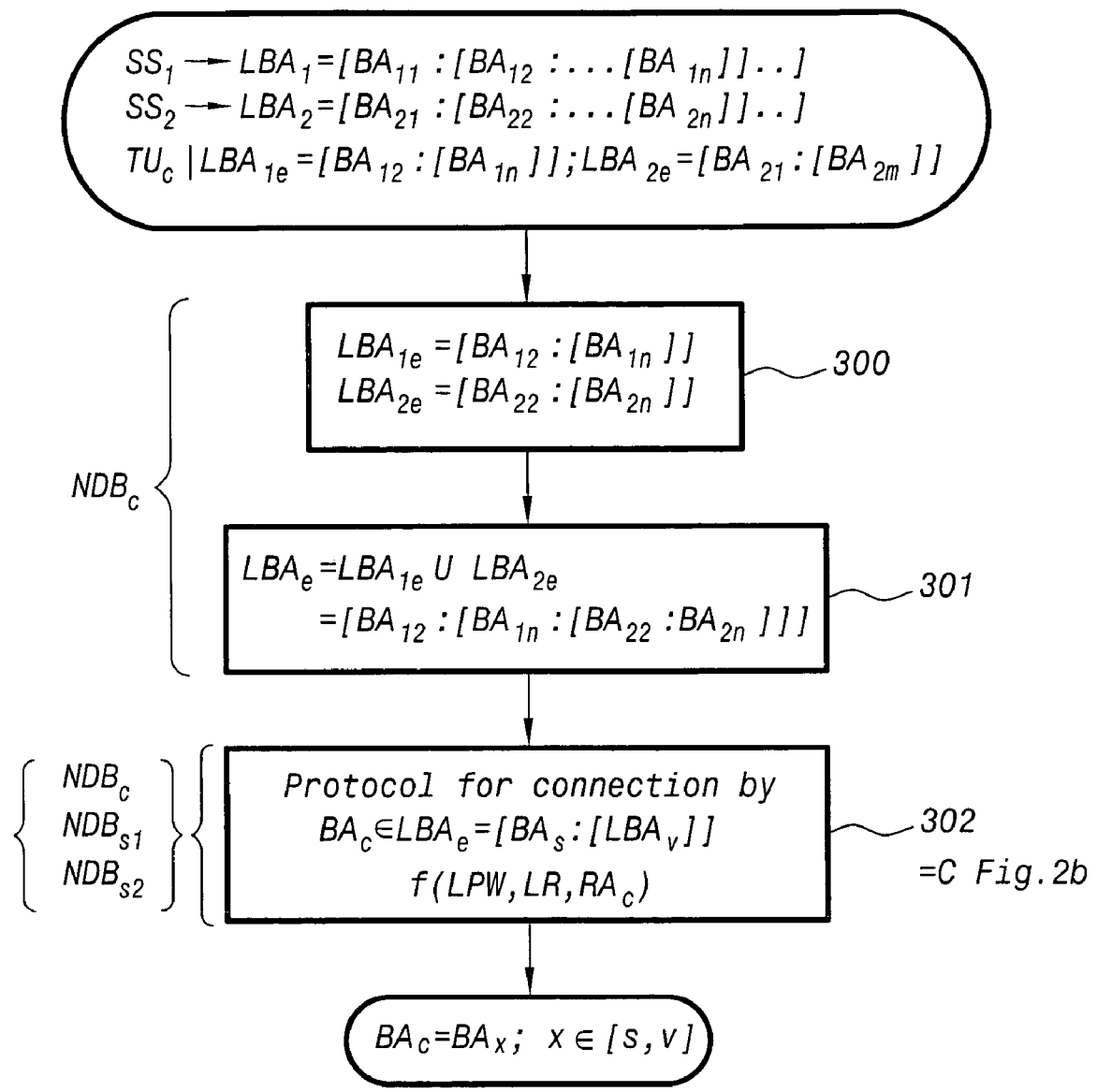
FIG. 4d shows by way of illustration a flow diagram of implementation of the method and the protocol for connection which are subjects of the invention applied to a virtual sub-assembly of radio access terminals formed by the central network database in the case of FIG. 4c.

The process of constituting the virtual sub-arrays of radio access terminals is illustrated and described in a non-limiting manner by way of example with reference to FIG. 4d.

In this situation of FIG. 4c there are:

the first sub-array of radio access terminals $SS_1$ represented by the list of radio access terminals $LBA_1 = [BA_{11} \vert [BA_{12} \vert \ldots [BA_{1n}]] \ldots ]$ the second sub-array of radio access terminals $SS_2$ represented by the list of radio access terminals $LBA_2 = [BA_{21} \vert [BA_{22} \vert \ldots [BA_{2m}]] \ldots ]$.

Also available are the prospective user terminal $TU_c$ and the eligible radio access terminals in the first and second sub-array of radio access terminals respectively, that is to say the lists of radio access terminals $LBA_{1e} = [BA_{12} \vert [BA_{1n}]]$ and $LBA_{2e} = [BA_{11} \vert [BA_{2m}]]$.

The eligible radio access terminals are the radio access terminals in direct vision of the user mobile terminal $TU_c$ and designated at the step 300 of FIG. 4d. The protocol according to the invention consists of forming the virtual sub-array VSS of radio access terminals at step 301 of FIG. 4d by the establishment of a sub-list of radio access terminals of the sub-array of radio access terminals, the sub-list being constituted by the list of eligible radio access terminals of the first sub-array $SS_1$, that is to say the list $LBA_{1e}$, and a second sub-list of radio access terminals of the second sub-array of radio access terminals $SS_2$ comprising in fact the list of eligible radio access terminals $LBA_{2e}$ of the second sub-array of radio access terminals $SS_2$.

At the step 301 the method then proceeds to bring about the joining of the aforementioned sub-lists by the concatenation of the sub-list $LBA_{1e}$ and the sub-list $LBA_{2e}$ in order to form resultant sub-list of eligible radio access terminals $LBA_e$ representative of the virtual sub-array of radio access terminals.

The connection protocol process can then be followed by the step 302 corresponding to the step C in FIG. 2b retaining the terminal $BA_{1n}$ of the first sub-array of radio access terminals $SS_1$ as specific radio access terminal $BA_s$ and all the other radio access terminals of the list of radio access terminals $LBA_e$ as adjacent terminals. Of course, the connection function is also applied in the same manner as in the case of the step C of FIG. 2b. The retained prospective radio access terminal is the radio access terminal $BA_x$, x belonging to s,v, as represented at step 302 of FIG. 4d.

It will be understood in particular that after the resultant sub-list $LBA_e$ is obtained which is representative of the virtual sub-array of radio access terminals SSV, the orders and messages for command of the radio access terminals which are representative of this latter but belonging to the first or second sub-array of radio access terminals respectively are transmitted for addressing by way of each corresponding secondary network database.

The invention claimed is:

1. A method of management of the resources of a broadband mobile network including at least prolonged fixed accesses by an array of wireless local area network radio access terminals and a broadband access server, characterised in that upon transmission of a request for access to an application transmitted by a prospective user mobile terminal to a specific radio access terminal for the purpose of connection of this prospective user mobile terminal to this specific radio access terminal, this method consists at least of:

discriminating on the one hand the level of radioelectric power of the signal emitted by the said access terminal received by the prospective user mobile terminal and on the other hand the network identifiers of the prospective user mobile terminal and of the requested application, based on the said request for access;

comparing the discriminated network identifiers with reference identifiers in order to ensure control of access to the said broadband mobile network; and, upon positive response to the comparison operation;

discriminating from a reference list including the said specific radio access terminal and at least one radio access terminal adjacent to this specific radio access terminal, chosen from amongst the said array of radio access terminals, as a function of the location of the said prospective user mobile terminal relative to the said specific radio access terminal, of the traffic load of each radio access terminal of the said array of radio access terminals and of the type of application required, a prospective radio access terminal for the execution of the said application, to the advantage of the said prospective user mobile terminal, by means of the said broadband access server;

and in that, for a sub-array of unavailable radio access terminals using the criterion of traffic throughput load thereof, the said sub-array being formed by the said specific radio access terminal and by a plurality of unavailable adjacent radio access terminals, a plurality of user mobile terminals being connected to each of the radio access terminals which constitute the said sub-array of unavailable radio access terminals, the said method further consists of:

recalculating the traffic throughputs assigned to each user mobile terminal connected for at least one of the radio access terminals of the said sub-array of unavailable access terminals, as a function of the conditions of access and executed application by each user mobile terminal connected, in such a way as to define a weighted traffic throughput capable of being assigned to each mobile user terminal connected;

assigning the weighted traffic throughput to each connected user terminal in such a way as to release, for the said radio access terminal of the said sub-array of unavailable radio access terminals, resources of transmission in terms of traffic throughput permitting the transmission of the request for access and the execution of the requested application $RA_c$ to the advantage of the said prospective user mobile terminal.

2. A method according to claim 1, characterised in that the step which consists of recalculating the traffic throughputs assigned to each connected user terminal comprises at least:

the attribution to each connected user mobile terminal of a coefficient of priority of transmission as a function of the conditions of access and the executed application;

the weighting of the traffic throughput assigned to each connected mobile terminal as a function of the assigned coefficient of priority of transmission.

3. A method according to claim 1, characterised in that the step consisting of discriminating a prospective radio access terminal for the transmission of the request for access and the execution of the said application to the advantage of the said prospective user mobile terminal is followed by a step of redirection of the flow towards the said prospective user mobile terminal executed by the said broadband access server and permitting the connection of the said prospective user mobile terminal to the broadband mobile network and the execution of the said application.

4. A system for management of the resources of a broadband mobile network including at least prolonged fixed accesses by an array of wireless local area network radio access terminals and a broadband access server, and further including interconnected with the broadband access server, command means for connection, for conditional transmission of the said request for access and for execution of the said application to the advantage of the said prospective user mobile terminal, the said command means including at least:

a module for discriminating, on the basis of the said request for access, network identifiers of the prospective user mobile terminal and the application requested by this prospective user mobile terminal and the said numerical value representing the said radioelectric power of the signal received;

an executable decision-making module including at least:

a module for comparison of the discriminated network identifiers with reference identifiers in order to ensure control of access to the said broadband mobile network; and upon a positive response of the comparison module, an executable module for discriminating, from a reference list of the said specific radio access terminal and at least one specific radio access terminal, as a function of the location of the said prospective user mobile terminal relative to the specific radio access terminal, the traffic throughput load of each radio access terminal of the said array of radio access terminals and the type of application requested, a prospective radio access terminal of the said array of radio access terminals for the transmission of the said request for access and the execution of the said application to the advantage of the said prospective user mobile terminal by means of the broadband access server, characterised in that the said executable discrimination module includes at least:

network database including at least the characteristics of each of the radio access terminals in terms of transmission throughput load and the number of user mobile terminals connected;

a calculation module for discriminating a prospective radio access terminal for the transmission of the said request for access and for the execution of the said application to the advantage of the said prospective user mobile terminal.

5. A system according to claim 4, characterised in that the said module for discriminating network identifiers of the prospective user mobile terminal includes at least one users database including the reference network identifiers and the conditions of access of each prospective user mobile terminal.

6. A system according to claim 4, characterised in that each radio access terminal includes a data table including at least:
- a list of network identifiers of each user mobile terminal connected to the said radio access terminal;
- a list of the user terminals in direct vision of the said radio access terminal and of the radioelectric power received by each of the said terminals in direct vision of the said radio access terminal;
- a list of the user terminals connected to the said radio access terminal, the conditions of access allocated to each of them and the radioelectric power received by each user terminal of the radio access terminal to which each of these user terminals is connected;
- a parameter of rates of occupancy in terms of throughput load of the said radio access terminal.

7. A system according to claim 4, characterised in that the said network database includes a data table including at least:
- a list of radioelectric characteristics of the different radio access terminals;
- a list of rates of occupancy of each radio access terminal;
- a list of the number of user terminals connected across each radio access terminal;
- a list of the user terminals in direct vision of each radio access terminal;
- a list of the user terminals having conditions of access but not detected by any one of the radio access terminals and therefore outside the network.

8. A system according to claim 6, characterised in that for the bidirectional transmission of information messages between the network database and one of the said radio access terminals to a user terminal, the said system consists of:
in the descending direction from the network database to the said radio access terminal:
- documenting and discriminating the said user terminal in the list of connected users and, upon a positive response to the discrimination of connection of the said user terminal,
- directly transmitting the said information message to the said user terminal via the said radio access terminal to which the said discriminated user terminal is connected, otherwise, as the user mobile terminal is not in connected mode,
- documenting and discriminating the said user terminal in the said list of user terminals which are not connected but are in direct vision of at least one adjacent radio access terminal, and, upon a positive response of discrimination of potential connection of the said prospective user terminal to at least one of the adjacent access terminals,
- transmitting the said information message from the network database to at least one of the said adjacent radio access terminals; and
- transmitting from one of the said adjacent radio access terminals having the information message available a message of request for connection to the said discriminated user terminal, the said discriminated user terminal then being capable of proceeding to change to connected mode relative to the said adjacent radio access terminal; otherwise, as the said user terminal is documented as outside the network,
- memorising the said information message in the said network database pending the change of the said user terminal to connected mode or to unconnected mode but in direct vision of at least one adjacent radio access terminal; and
- relaunching the procedure in connected mode or respectively in unconnected mode but in direct vision of at least one adjacent radio access terminal when the said user terminal changes to one or the other mode; and in the ascending direction from a radio access terminal to the said network database,
- periodically transmitting information messages containing the information items contained in the data table of the said radio access terminal.

9. A system according to claim 4, characterised in that for the bidirectional transmission of information messages between a radio access terminal and the said user terminal the said system consists of
in the descending direction from the said radio access terminal to the said user terminal:
- transmitting messages for collection of information relating to the user terminals situated in direct vision of the said radio access terminal, the said collection messages comprising the transmission by each user terminal of identifier information of the user terminal, conditions of access to the network and radioelectric power of reception; and in the ascending direction from each user terminal to any radio access terminal in direct vision but in the absence of connection of this user terminal relative to this radio access terminal:
- transmitting periodic request messages to any radio access terminal in direct vision in order to determine the existence of pertinent information messages in relation to the said user terminal in question and memorised at the level of the radio access terminal, the user terminal not being connected but in direct vision, the said pertinent information messages concerning any message such as a voice message, a short text message, e-mail, missed call; and upon a positive response, when a memorised pertinent information message exists, in the descending direction from the said radio access terminal to the said user terminal,
- transmitting from the said radio access terminal to the said user terminal a message of notification of connection in order that this latter should be capable either of responding to an incoming call or recovering the pertinent information which concerns it.

10. A system according to claim 4, characterised in that the said network database comprises at least:
- a central network database;
- a plurality of secondary network databases, each secondary network database being connected in a network with the said central database, each secondary network database having associated with it a sub-array of radio access terminals of the array of radio access terminals of the network, the sub-arrays of radio access terminals forming the array of radio access terminals which constitute the network being discrete, the said central network database making it possible to manage the said arrays of radio access terminals by way of the said secondary network databases.

11. A protocol for connection of a user terminal to a broadband mobile network including at least prolonged fixed accesses by an array of wireless local area network radio access terminals, a broadband access server and a system of management of the resources of this network according to claim 4, characterised in that for a user terminal which in connected mode is connected to a prospective radio access terminal which constitutes this network, consisting at least of at the level of the said prospective radio access terminal:

updating in the table of data of the said radio access terminal the list of connected user terminals on the basis of the parameters of the radioelectric power received by this user terminal and the conditions of access allocated to this user terminal;

transmitting the said data table from the specific radio access terminal to a network database; and at the level of the said network database updating the data tables of the said network database by updating the parameters of occupancy rate of the said specific radio access terminal, the number of user terminals connected across the said specific radio access terminal, and the list of user terminals connected;

discriminating the functional position of the said user terminal by this user terminal belonging to the list of connected user terminals, to the list of user terminals not connected but in direct vision of the said specific radio access terminal, the list of user terminals outside the network, and using the criterion of the said user terminal belonging to the list of user terminals connected to the said specific radio access terminal, transmitting from the network database to the prospective radio access terminal a message of notification of calling the connected user terminal; and at the level of the said prospective radio access terminal, transmitting the said message of notification of calling to the said connected user terminal.

12. A connection protocol according to claim 11, characterised in that the said network database being constituted by a central network database with which is associated a plurality of secondary network databases, each secondary network database having associated with it a sub-array of radio access terminals, the said sub-arrays of radio access terminals being discrete, the said step consisting of transmitting to the said prospective radio access terminal a message of notification of calling the connected user terminal is executed between the secondary network database and the prospective radio access terminal with which this latter is associated.

13. A connection protocol according to claim 11, characterised in that for a prospective user terminal for access to an application and a connection relative to a sub-array of radio access terminals, the said sub-array of radio access terminals being associated with a secondary network database, the said prospective user terminal being in direct vision of at least one adjacent radio access terminal separate from this sub-array of radio access terminals and belonging to another sub-array of radio access terminals with which another secondary network database is associated, the said connection protocol consists at least of:

forming from this sub-array of radio access terminals and this other sub-array of radio access terminals a virtual sub-array of radio access terminals constituted by joining some of the radio access terminals of this sub-array and adjacent radio access terminals of this other sub-array of radio access terminals;

subjecting the said prospective user terminal to a protocol for connection to one of the radio access terminals constituting the said virtual sub-array of radio access terminals by way of the said secondary network database and the said other secondary network database under the control of the said central network database in accordance with the method of management of the resources of a broadband mobile network according to.

14. A connection protocol according to claim 13, characterised in that the step consisting of forming the said virtual sub-array of radio access terminals comprises at the level of the said central network database:

the establishment of a sub-list of radio access terminals of the said sub-array of radio access terminals and another sub-list of radio access terminals of the said other sub-array of radio access terminals comprising the said at least one adjacent radio access terminal;

the concatenation of the said sub-list and the said other sub-list in order to form another resultant sub-list of eligible radio access terminals representative of the said virtual sub-array of radio access terminals;

the transmission to each of the said pertinent radio access terminals constituting this sub-array and this other sub-array respectively and command on the basis of the said central network database by way of the said secondary network database or respectively the said other secondary network database.

* * * * *